(12) United States Patent
Takahashi et al.

(10) Patent No.: US 12,531,463 B2
(45) Date of Patent: Jan. 20, 2026

(54) ROTARY RECIPROCATING DRIVE ACTUATOR

(71) Applicants: Yuki Takahashi, Tokyo (JP); Yasutaka Kitamura, Tokyo (JP); Masaharu Kagami, Tokyo (JP); Yuki Otsuka, Tokyo (JP); Kai Masamoto, Tokyo (JP)

(72) Inventors: Yuki Takahashi, Tokyo (JP); Yasutaka Kitamura, Tokyo (JP); Masaharu Kagami, Tokyo (JP); Yuki Otsuka, Tokyo (JP); Kai Masamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 188 days.

(21) Appl. No.: 18/351,576

(22) Filed: Jul. 13, 2023

(65) Prior Publication Data

US 2024/0022154 A1    Jan. 18, 2024

(30) Foreign Application Priority Data

Jul. 15, 2022  (JP) ................................ 2022-114256
Aug. 26, 2022  (JP) ................................ 2022-134985

(51) Int. Cl.
*H02K 33/16*     (2006.01)
*G02B 26/10*     (2006.01)
*H02K 11/22*     (2016.01)

(52) U.S. Cl.
CPC ........... *H02K 33/16* (2013.01); *G02B 26/105* (2013.01); *H02K 11/22* (2016.01)

(58) Field of Classification Search
CPC ....... H02K 33/16; H02K 11/22; G02B 26/105
See application file for complete search history.

(56) References Cited

U.S. PATENT DOCUMENTS 4,919,500 A * 4/1990 Paulsen .................. G02B 26/08
                                                            359/214.1
5,283,682 A * 2/1994 Ostaszewski ........ G02B 7/1821
                                                            310/22

(Continued)

FOREIGN PATENT DOCUMENTS

JP        07-298555 A     11/1995
JP        11-225465 A      8/1999

(Continued)

OTHER PUBLICATIONS

Extended European Search Report dated Dec. 8, 2023.

(Continued)

*Primary Examiner* — Forrest M Phillips
(74) *Attorney, Agent, or Firm* — Shih IP Law Group, PLLC.

(57) ABSTRACT

A rotary reciprocating drive actuator includes: a movable body including a shaft part to which a movable object is connected, and a magnet; a base portion including a pair of wall portions disposed to sandwich the movable object and support the shaft part; a core assembly including a core body including a plurality of magnetic poles, a coil body, and a magnet position holding portion to define a reference position of the reciprocating rotation, the core assembly being attached to one wall portion; and a sensor board that is attached to an other wall portion and on which a sensor configured to detect a rotational angle of the one end portion of the shaft part is mounted, in which the sensor board is disposed such that the sensor faces the other wall portion from an outer surface side of the other wall portion and detects the rotational angle.

5 Claims, 19 Drawing Sheets

(56) References Cited

U.S. PATENT DOCUMENTS

| | | | |
|---|---|---|---|
| 5,610,752 A * | 3/1997 | Hayakawa | G06K 7/10584 |
| | | | 359/198.1 |
| 5,686,832 A * | 11/1997 | Ayres | G01R 7/06 |
| | | | 324/144 |
| 2016/0233753 A1 | 8/2016 | Benner, Jr. | |
| 2019/0296627 A1 | 9/2019 | Takahashi | |
| 2021/0184554 A1* | 6/2021 | Takahashi | H02K 33/12 |
| 2021/0265904 A1 | 8/2021 | Takahashi | |
| 2021/0273543 A1 | 9/2021 | Takahashi | |
| 2022/0043030 A1 | 2/2022 | Xu | |
| 2022/0043255 A1 | 2/2022 | Kitamura | |
| 2023/0026476 A1 | 1/2023 | Takahashi | |

FOREIGN PATENT DOCUMENTS

| | | |
|---|---|---|
| JP | 4727509 B2 | 7/2011 |
| JP | 2012-141248 A | 7/2012 |
| JP | 2019-170118 A | 10/2019 |
| JP | 2020-006344 A | 1/2020 |
| JP | 2021-096295 A | 6/2021 |
| JP | 2021-097443 A | 6/2021 |
| JP | 2022-030904 A | 2/2022 |
| WO | 2021117863 A1 | 6/2021 |

OTHER PUBLICATIONS

Notice of the Reasons for Rejection for Japanese Patent Application No. 2022114256, dated Nov. 4, 2025.

Notice of Reasons for Refusal for Japanese Patent Application No. 2022-134985 dated Nov. 11, 2025.

* cited by examiner

35

350

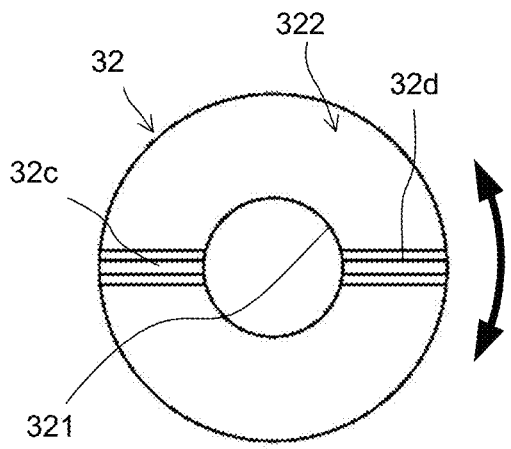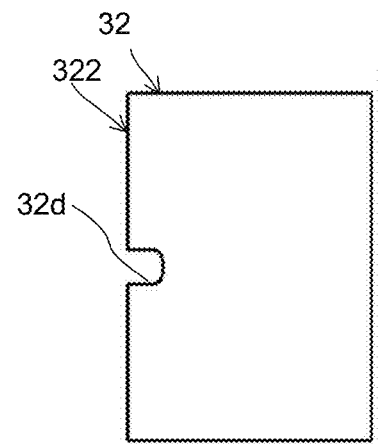
FIG. 22A  FIG. 22B
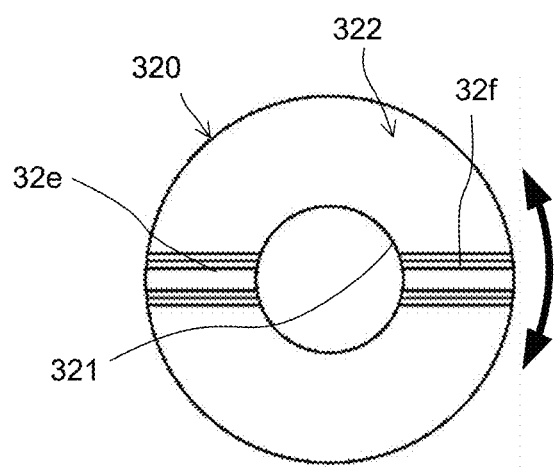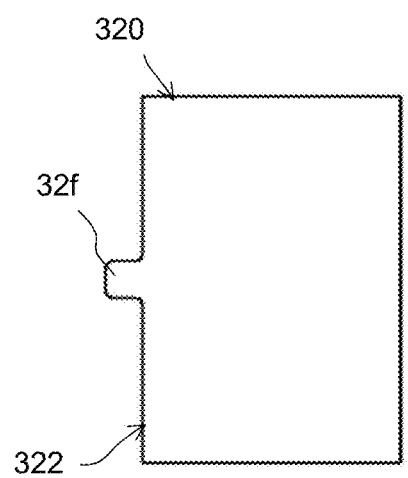
FIG. 23A  FIG. 23B

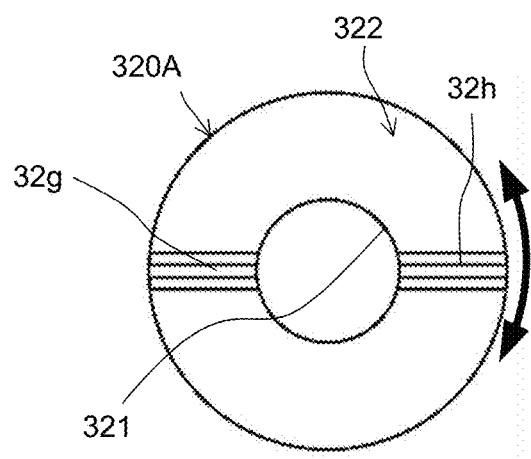
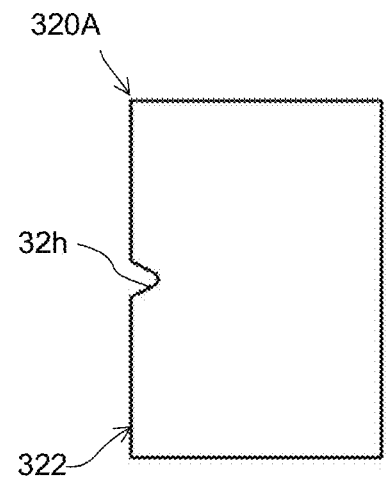
FIG. 24A  FIG. 24B
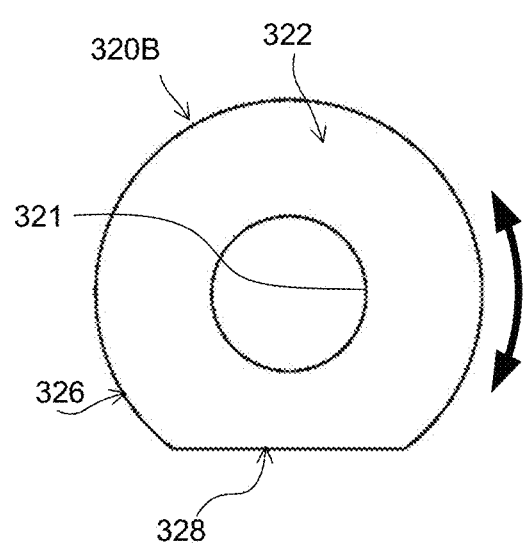
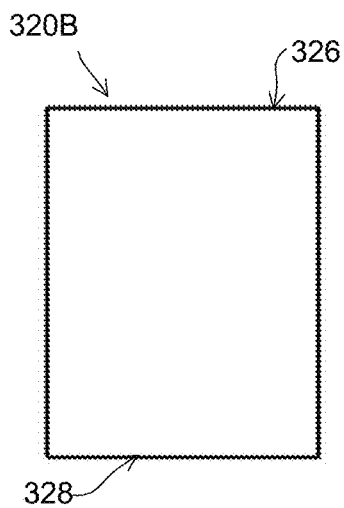
FIG. 25A  FIG. 25B

ROTARY RECIPROCATING DRIVE ACTUATOR

CROSS REFERENCE TO RELATED APPLICATIONS

This application is entitled to and claims the benefit of Japanese Patent Application No. 2022-114256, filed on Jul. 15, 2022, and Japanese Patent Application No. 2022-134985, filed on Aug. 26, 2022, the disclosure of which including the specification, drawings and abstract is incorporated herein by reference in its entirety.

TECHNICAL FIELD

The present invention relates to a rotary reciprocating drive actuator.

BACKGROUND ART

Conventionally, a rotary reciprocating drive actuator is used as an actuator used in an optical scanning apparatus such as a multifunctional machine, a laser beam printer, or the like. Specifically, the rotary reciprocating drive actuator causes a reciprocating rotation of the mirror of the scanner to change a reflection angle of a laser beam to achieve optical scanning of an object.

Patent Literature (hereinafter, referred to as "PTL") 1 discloses a galvanometer motor as this type of rotary reciprocating drive actuator. As galvanometer motors, various types of galvanometer motors are known in addition to the type of galvanometer motor with the structure disclosed in PTL 1 and a galvanometer motor of a movable coil type in which a coil is attached to a mirror.

PTL 1 discloses a beam scanner in which four permanent magnets are disposed on a rotation shaft to which the mirror is attached, such that the permanent magnets are magnetized in the radial direction of the rotation shaft, and in which cores that have magnetic poles around which a coil is wound are disposed to sandwich the rotation shaft.

CITATION LIST

Patent Literature

PTL 1: U.S. Pat. No. 4,727,509

SUMMARY OF INVENTION

Technical Problem

Meanwhile, as also described in PTL 1, the rotary reciprocating drive actuator is provided with an angle sensor for detecting a rotational angle of the rotation shaft connected to the mirror. The scanning accuracy of the actuator as a scanner largely depends on the detection accuracy of the angle sensor. In order to improve the detection accuracy of the angle sensor, it is necessary to adjust an assembling position of the angle sensor with high accuracy so that the relative relationship between the angle sensor and other components such as the mirror of the rotary reciprocating drive actuator is determined.

When the angle sensor is not disposed in the vicinity of a bearing that supports the rotation shaft, it is difficult to accurately detect the rotational angle of the rotation shaft due to an influence of a shaft shake. Further, when the angle sensor is disposed close to a motor, there is a problem that it is difficult to perform suitable measurement due to the influence of electromagnetic noise, heat generation, or the like from the motor.

An object of the present invention is to provide a rotary reciprocating drive actuator capable of driving a movable object more suitably at a high amplitude.

Solution to Problem

To achieve the above object, the present invention is configured to include:
a movable body including:
  a shaft part to which a movable object is connected at one end portion side of the shaft part, and
  a magnet fixed at an other end portion side of the shaft part, the movable body being configured to perform a reciprocating rotation about an axis;
a base portion including a pair of wall portions that are disposed to sandwich the movable object and support the shaft part via a bearing at the one end portion side such that the shaft part is rotatable;
a core assembly including:
  a core body comprising a plurality of magnetic poles facing an outer circumference of the magnet to sandwich the magnet,
  a coil body that is wound around the core body and that is energized to generate a magnetic flux interacting with the magnet to cause a reciprocating rotation of the movable body, and
  a magnet position holding portion that generates a magnetic attraction force between the magnet position holding portion and the magnet to define a reference position of the reciprocating rotation, the core assembly being attached to one wall portion of the pair of wall portions; and
a sensor board that is attached to an other wall portion of the pair of wall portions and on which a sensor configured to detect a rotational angle of one end portion of the shaft part is mounted, in which
the sensor board is disposed such that the sensor faces the other wall portion from an axially outer surface side of the other wall portion and detects the rotational angle.

Advantageous Effects of Invention

According to the present invention, it is possible to accurately detect the rotation of a shaft connected to a movable object, and thus to drive the movable object more suitably at a high amplitude.

BRIEF DESCRIPTION OF DRAWINGS

FIGS. 22A and 22B are a front view and a right side view of Variation 1 of the magnet;

FIGS. 23A and 23B are a front view and a right side view of Variation 2 of the magnet;

FIGS. 24A and 24B are a front view and a right side view of Variation 3 of the magnet;

FIGS. 25A and 25B are a front view and a right side view of Variation 4 of the magnet.

DESCRIPTION OF EMBODIMENTS

Hereinafter, embodiments of the present invention will be described with reference to the drawings.

Figure 1:
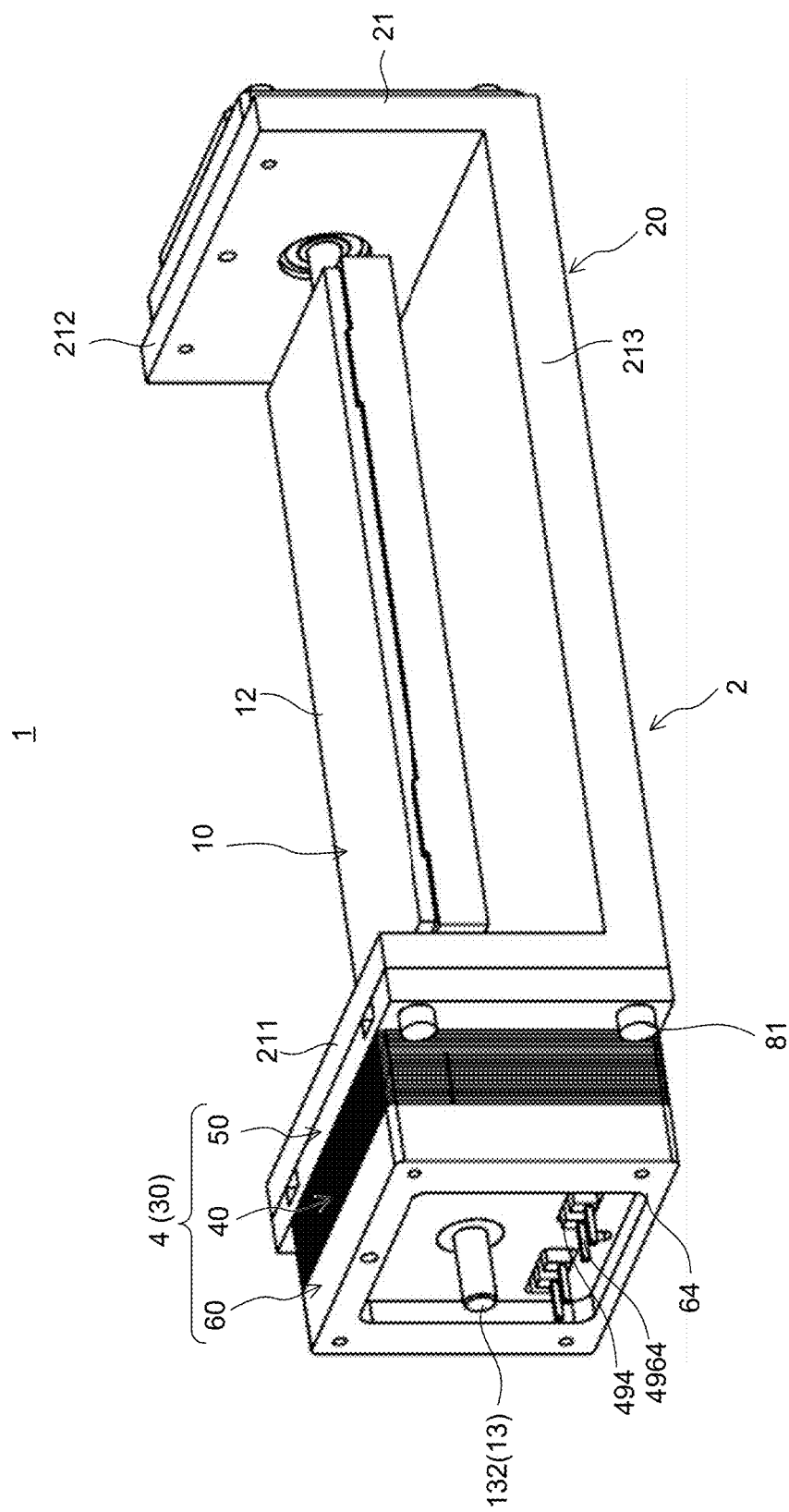
FIG. 1 is an external perspective view of a rotary reciprocating drive actuator according to Embodiment 1 of the present invention.
Figure 2:
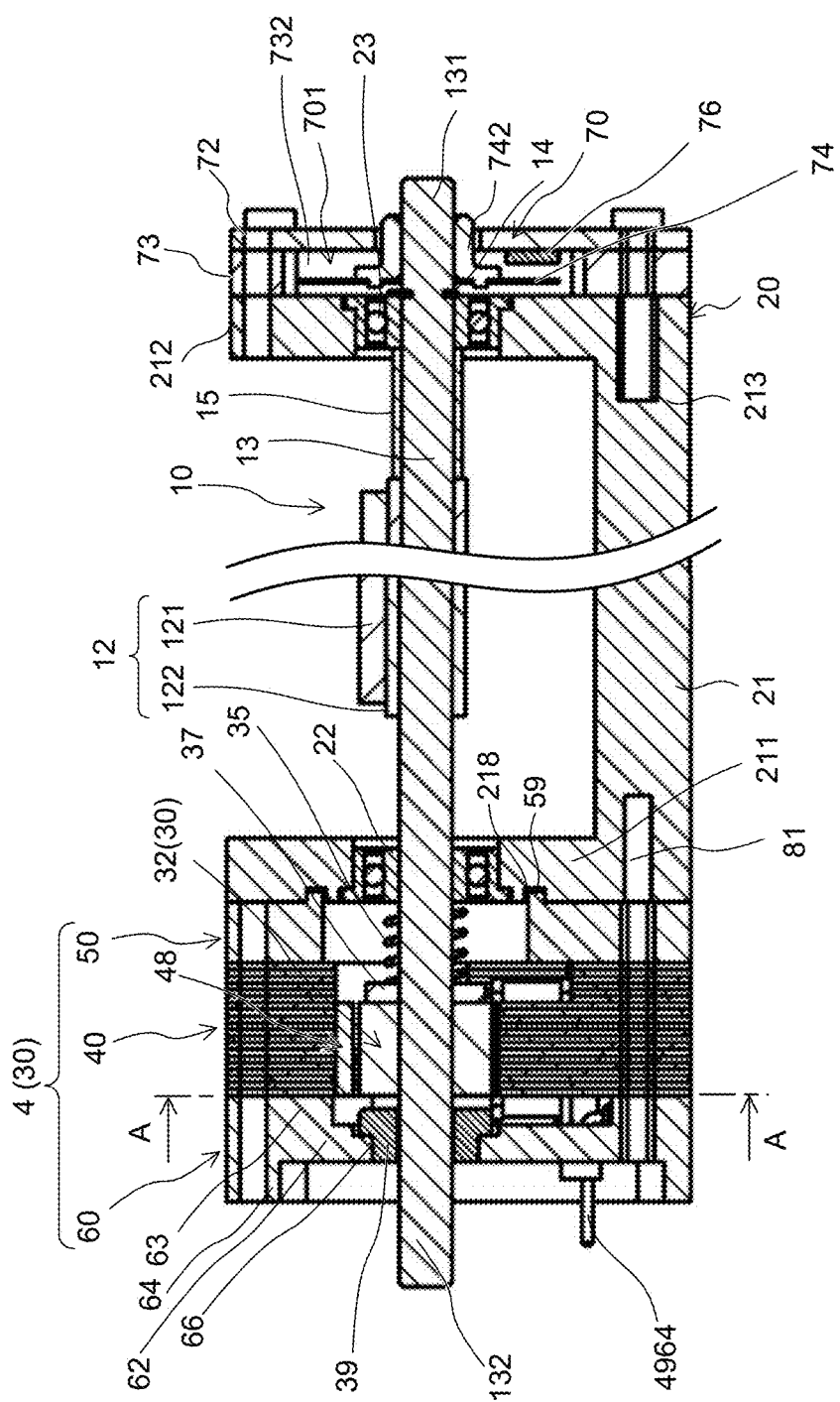
FIG. 2 is a longitudinal sectional view along the axial center of the rotary reciprocating drive actuator.
Figure 3:
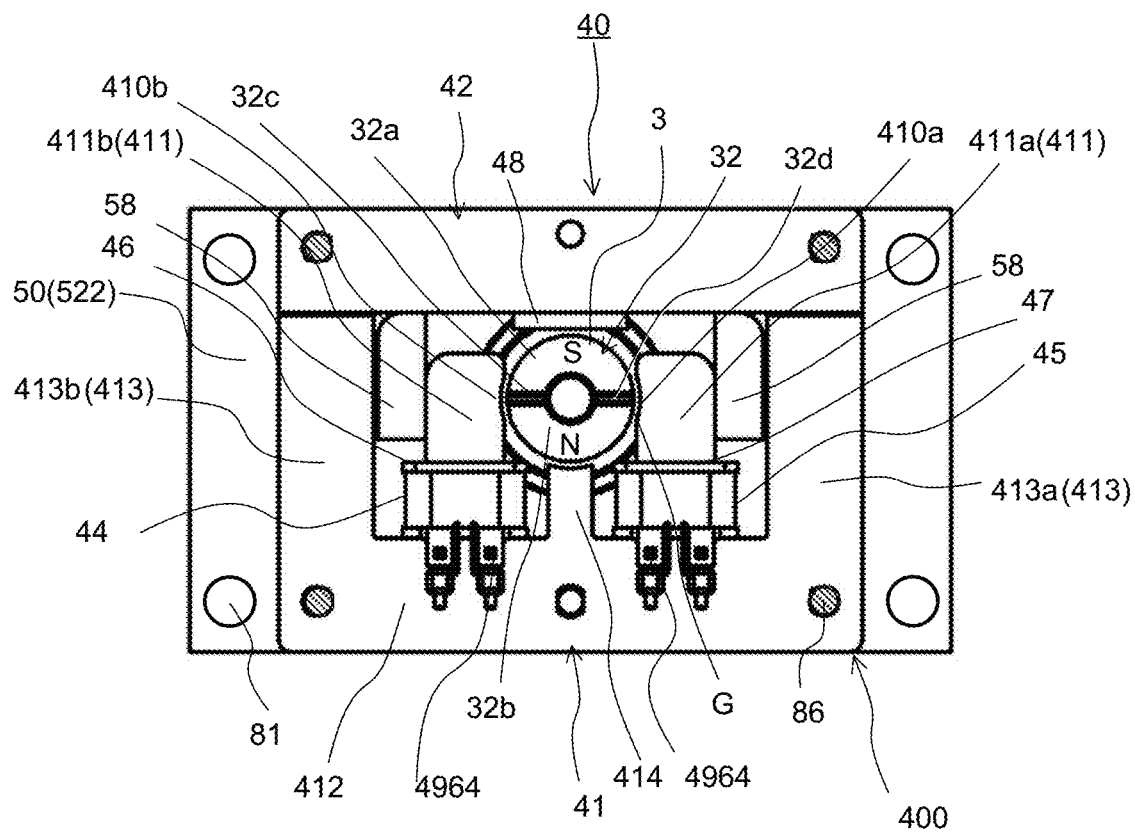
FIG. 3 is an end view of a part at line A-A in FIG. 2 in which a left member is removed from the front end face of a driving unit.
Figure 4:
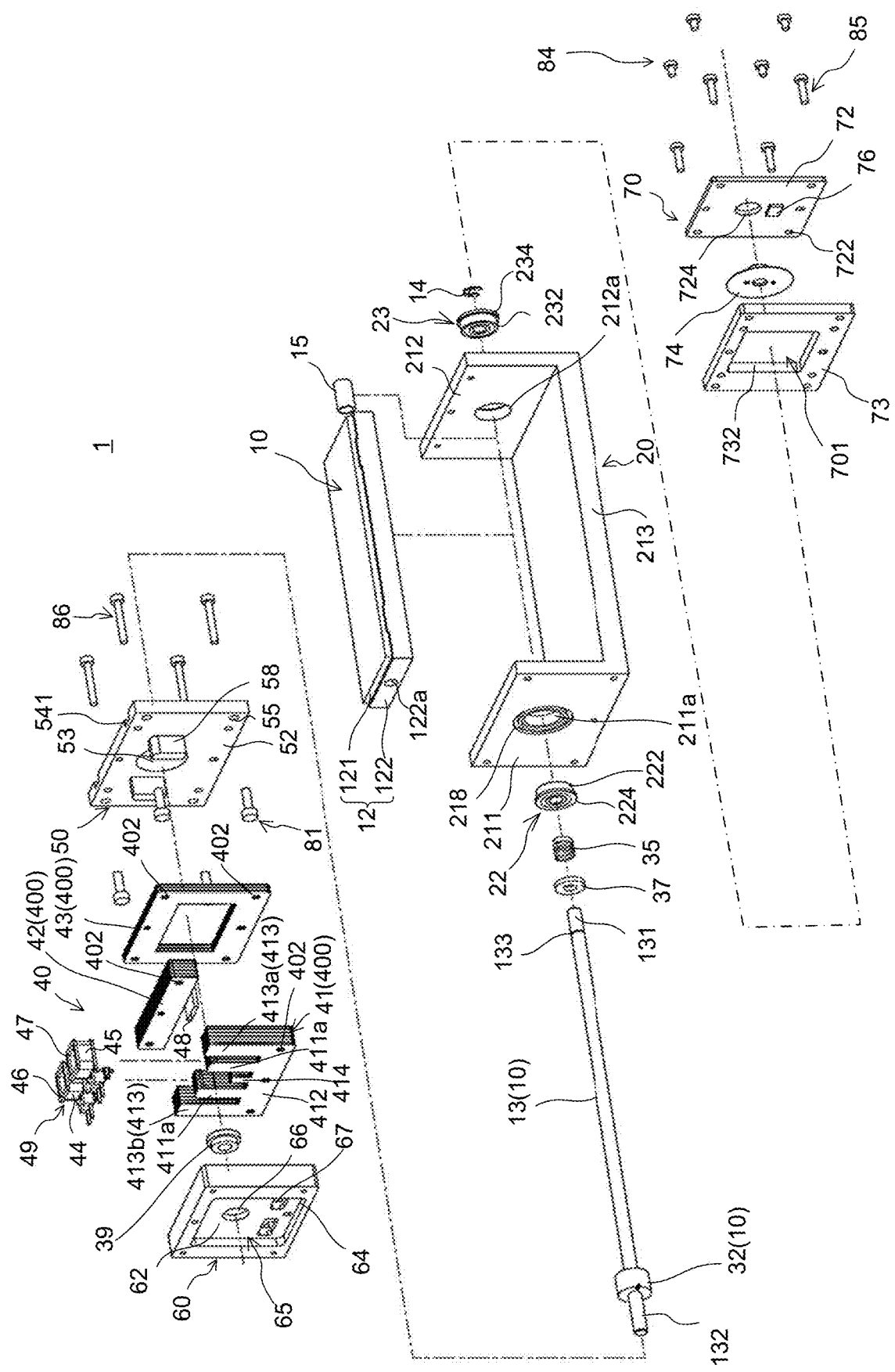
FIG. 4 is an exploded perspective view of the rotary reciprocating drive actuator.

FIG. 1 is an external perspective view of rotary reciprocating drive actuator 1 according to Embodiment 1 of the present invention, and FIG. 2 is a longitudinal sectional view taken along an axial center of rotary reciprocating drive actuator 1. Further, FIG. 3 is an end view of a part at line A-A in FIG. 2 in which a left member is removed from the front end face of driving unit 4 such that the inside of driving unit 4 can be seen, and FIG. 4 is an exploded perspective view of rotary reciprocating drive actuator 1.

Rotary reciprocating drive actuator 1 is used, for example, in a Laser Imaging Detection and Ranging (LiDAR) apparatus. Note that, rotary reciprocating drive actuator 1 is also applicable to an optical scanning apparatus such as a multifunctional machine, a laser beam printer, or the like.

Rotary reciprocating drive actuator 1 broadly includes movable body 10, base portion 21 that supports movable body 10 such that movable body 10 is rotatable and to which angle sensor part 70 is attached, and driving unit 4 that drives a reciprocating rotation of movable body 10 with respect to base portion 21. Base portion 21 and driving unit 4 constitute fixing body 20 that supports movable body 10 such that the reciprocating rotation of movable body 10 is capable of being driven.

Further, in rotary reciprocating drive actuator 1, movable body 10 is attached to base portion 21 to form main body unit 2, and rotary reciprocating drive actuator 1 includes driving unit 4 at one end portion of main body unit 2.

As illustrated in FIG. 1, in rotary reciprocating drive actuator 1, main body unit 2 including movable body 10 attached to base portion 21 and driving unit 4 are joined to each other by fastening members 81. Note that fastening members 81 may be any member as long as main body unit 2 and driving unit 4 can be integrally fixed to each other, and for example, an external screw such as a small screw or a screw and/or a bolt nut may be used.

As illustrated in FIG. 4, movable body 10 includes rotation shaft 13, mirror part 12, and movable magnet (hereinafter, simply referred to as "magnet") 32. Details of magnet 32 will be described in detail together with driving unit 4 described later.

Mirror part 12 is a movable object in rotary reciprocating drive actuator 1, and is connected to rotation shaft 13. Mirror part 12 is formed, for example, by attaching mirror 121 to one surface of mirror holder 122. Rotation shaft 13 is inserted into and fixed to insertion hole 122a of mirror holder 122. Mirror part 12 reflects scanning light.

Base portion 21 has flat bottom portion 213 and a pair of wall portions 211 and 212 disposed to be spaced apart from each other. Bottom portion 213 has a flat plate shape and is disposed to extend in the axial direction, and a pair of wall portions 211 and 212 are disposed upright on the opposite ends of bottom portion 213 so as to face each other. Base portion 21 is formed with a substantially U-shaped section by bottom portion 213 and the pair of wall portions 211 and 212.

Each of the pair of wall portions 211 and 212 has a rectangular plate shape, and insertion holes 211a and 212a are formed in the central portions thereof (see FIG. 4). Bearings 22 and 23 are internally fitted to insertion holes 211a and 212a.

In addition, insertion holes 211a and 212a are, at the axially outer opening edge portions of wall portions 211 and 212, provided respectively with spot-facing portions having a diameter larger than that of penetrating portions. Flanges 224 and 234 of bearings 22 and 23 are fitted to the spot-facing portions.

In bearings 22 and 23, flanges 224 and 234 are disposed at the opening edges on one sides of doughnut-shaped bearing main bodies 222 and 232. Bearings 22 and 23 are fitted in insertion holes 211a and 212a in wall portions 211 and 212 of base portion 21 from the axially outer side, and accordingly, flanges 224 and 234 are fitted to the spot-facing portions. Bearings 22 and 23 are fixed to base portion 21 by press-fitting or the like in a state in which bearings 22 and 23 are prevented from coming off in the fitting direction.

As a result, bearing main bodies 222 and 232 of bearings 22 and 23 do not protrude outward from wall portions 211 and 212 with respect to base portion 21, and wall portions 211 and 212 of base portion 21 can be made thinner, thereby reducing the overall length of rotary reciprocating drive actuator 1.

Further, flanges 224 and 234 of bearings 22 and 23 are fitted to the spot-facing portions of insertion holes 211a and 212a on the axially outer side (the outer surface side of wall portions 211 and 212). Thus, during the assembly of main body unit 2, the fitting state of flanges 224 and 234 fitted to insertion holes 211a and 212a can be easily visually recognized and measured from the outer side of wall portions 211 and 212.

Bearings 22 and 23 may be composed of rolling bearings (for example, ball bearings) or plain bearings for base portion 21. For example, when bearings 22 and 23 are rolling bearings, the friction coefficient is low, and rotation shaft 13 can be smoothly rotated. Thus, the driving performance of rotary reciprocating drive actuator 1 is improved. Thus, rotation shaft 13 is rotatably attached to base portion 21 via bearings 22 and 23, and mirror part 12, which is a movable object, is disposed between the pair of wall portions 211 and 212.

Rotation shaft 13 is inserted into bearings 22 and 23, and the opposite end portions of rotation shaft 13 protrude outward from bearings 22 and 23 in the axial direction. Bearings 22 and 23 support rotation shaft 13 on base portion 21 around the axis such that the rotation shaft is rotatable.

Mirror part 12 which is a movable target is fixed to a portion of rotation shaft 13 on the one end portion 131 side inserted to extend between the pair of wall portions 211 and 212 of base portion 21, and magnet 32 is fixed to the other end portion 132 side of rotation shaft 13. Thus, rotation shaft 13 is supported by the pair of wall portions 211 and 212 of base portion 21. Since base portion 21 supports mirror part 12 disposed between the pair of wall portions 211 and 212 from opposite sides via rotation shaft 13, the mirror part can be supported more firmly than can be supported by the configuration for supporting mirror part 12 by the rotation shaft supported by a cantilever. Thus, impact resistance and vibration resistance are enhanced.

Magnet 32 is disposed in driving unit 4, which will be described later, and is reciprocally rotationally driven by a magnetic flux generated by driving unit 4. Rotation shaft 13 causes a reciprocating rotation of mirror part 12 by electromagnetic interaction between driving unit 4 and magnet 32.

Retaining portion (retaining ring) 14 is fitted into fitting groove 133 in one end portion 131 of rotation shaft 13 protruding to the outside of bearing 23, and movement of rotation shaft 13 toward the other end portion 132 side is restricted by retaining portion 14. Further, one end portion 131 of rotation shaft 13 is inserted through wall portion (other wall portion) 212 on the one end portion 131 side, and is connected to angle sensor part 70 at the outer surface side of wall portion 212. Angle sensor part 70 detects an angle of rotation shaft 13, and is disposed in rotary reciprocating drive actuator 1 such that mirror part 12 is sandwiched between angle sensor part 70 and driving unit 4. That is, angle sensor part 70 is spaced apart from the magnetic circuit of driving unit 4 and disposed in the vicinity of bearing 23. Details of angle sensor part 70 will be described later.

Cylindrical stopper portion 15 is externally fitted to a portion of rotation shaft 13 between mirror holder 122 of mirror part 12 and wall portion 212 of the pair of wall portions on the side of one end portion 131.

Stopper portion 15 is fixed to rotation shaft 13. Movement of rotation shaft 13 toward the one end portion 131 side is restricted by bearing 23, and movement of rotation shaft 13 toward the other end portion 132 side is restricted by retaining portion 14. Mirror part 12 fixed to rotation shaft 13 is restricted via retaining portion 14 from moving to the other end portion 132 side in the axial direction with respect to base portion 21.

Via mirror part 12, stopper portion 15 prevents rotation shaft 13 from coming off bearing 23 toward the one end portion side, that is, on the outside in the axial direction.

Stopper portion 15, together with retaining portion 14, restricts the axial movement of movable body 10 including mirror part 12, rotation shaft 13, and magnet 32 within a predetermined range including tolerances and the like. The movable body is prevented from coming off base portion 21.

Rotation shaft 13 is disposed on base portion 21 such that the other end portion 132 side of base portion 21 protrudes from wall portion (one wall portion) 211 to the outside of base portion 21 through bearing 22. A portion protruding from wall portion 211 is inserted through driving unit 4.

Magnet 32 fixed to the other end portion 132 side of rotation shaft 13 is disposed at the portion protruding outward from wall portion 211 of base portion 21.

Preload spring 35, annular receiving portion 37, and magnet 32 are disposed on the portion of rotation shaft 13 protruding from wall portion 211 toward the other end portion 132 side in this order from the wall portion 211 side.

Preload spring 35 extends and contracts in the axial direction to bias bearing 22 in the axial direction.

Figure 5:
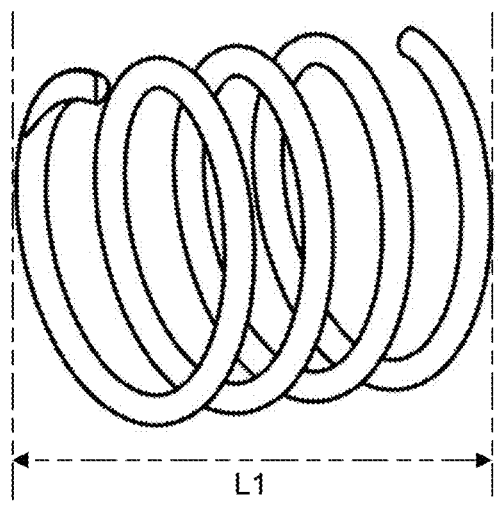
FIG. 5 is an enlarged view of a preload spring.

As illustrated in FIG. 5, preload spring 35 is, for example, a cylindrical coil spring having predetermined length L1 corresponding to a space in which preload spring 35 is disposed, and having flat surfaces formed at both ends thereof spaced apart in a predetermined length direction.

Preload spring 35 is disposed to be externally fitted to rotation shaft 13, and biases magnet 32 in a direction away from bearing 22 fitted in wall portion 211.

Preload spring 35 is interposed between annular receiving portion 37 adjacent to magnet 32 and bearing 22 in a state in which rotation shaft 13 is inserted.

Preload spring 35 applies a constant pressure preload to bearing 22. By applying the constant pressure preload to bearing 22 by preload spring 35, it is possible to absorb, by the spring, the expansion and contraction of rotation shaft 13 due to the variation of a load and the temperature difference between rotation shaft 13 and base portion 21 during rotation, so as to obtain a stable preload amount with a small variation of the pressurization amount. Therefore, preload spring 35 is capable of preventing the vibration of rotation shaft 13 in the axial direction due to the high-speed rotation of rotation shaft 13, and achieving rotary drive at a higher speed than with a predetermined position preload, thereby preventing the vibration in the axial direction.

Preload spring 35 applies a preload to bearings (in particular, ball bearings) 22 and 23, thereby maintaining the low slidability and the high reliability of the rotational driving of rotation shaft 13 and enabling stable driving.

It is preferable that preload spring 35 be configured to be in contact with a component that is firmly fixed, and to receive a preload from the component. Annular receiving portion 37 is a press-fitting ring, and is fixed to rotation shaft 13 by being press-fitted to an outer circumferential portion of rotation shaft 13 with respect to rotation shaft 13.

Annular receiving portion 37 receives one end portion of preload spring 35 which makes contact with bearing 22 at one end portion side, thereby preventing direct impact from being applied to magnet 32 which is an adhesively fixed component. As a result, it is possible to prevent an unnecessary force from being applied to magnet 32, and to improve reliability.

Further, since preload spring 35 is disposed inside rotary reciprocating drive actuator 1, it is possible to ensure a design for a stable preload not affected from the outside of rotary reciprocating drive actuator 1.

Note that for preload spring 35, a wave spring which has a shape obtained by spirally or annularly coiling a plate-shaped steel wire and by adding waves to the wire may also be used as a spring having a low height in an extension-contraction direction (i.e., having a low height as a spring), instead of a cylindrical coil spring obtained by spirally coiling a round steel wire.

Figure 6:
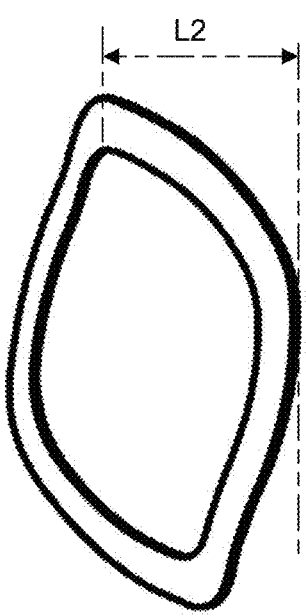
FIG. 6 illustrates a wave spring which is a variation of the preload spring.

For example, preload spring 350 being the wave spring illustrated in FIG. 6 may be used as preload spring 350 having an axial length shorter than axial length L1 of the cylindrical coil spring as preload spring 35.

In preload spring 350, which is a wave spring, length L2 in the axial direction, which is the extension-contraction direction, is shorter than length L1 of the cylindrical coil spring.

When length L0 between wall portion 211 and annular receiving portion 37 falls under the condition such as within length L2<L0<L1, it is possible to change the extension and contraction length of preload spring 350 by stacking a plurality of preload springs 350 in the direction of length L2.

In this way, preload springs 35 and 350 can be appropriately changed in accordance with an installation location or a preload target to adjust the preload force for suitable high-speed rotation and stable drive of the spring while vibration in the axial direction is prevented.

<Driving Unit 4>

Driving unit 4 illustrated in FIGS. 2 to 4 and 7 is disposed on one of axially distant opposite end portions of base portion 21, and forms a part of fixing body 20. Driving unit 4 and angle sensor part 70 are disposed to sandwich base portion 21 in the axial direction. Driving unit 4, together with magnet 32, forms driving part 30 and moves movable body 10. Driving unit 4 includes bottom cover 50, core assembly 40, and top cover 60. Driving unit 4 is formed in, for example, a rectangular parallelepiped shape having a square shape in front view.

<Core Assembly 40>

Figure 14:
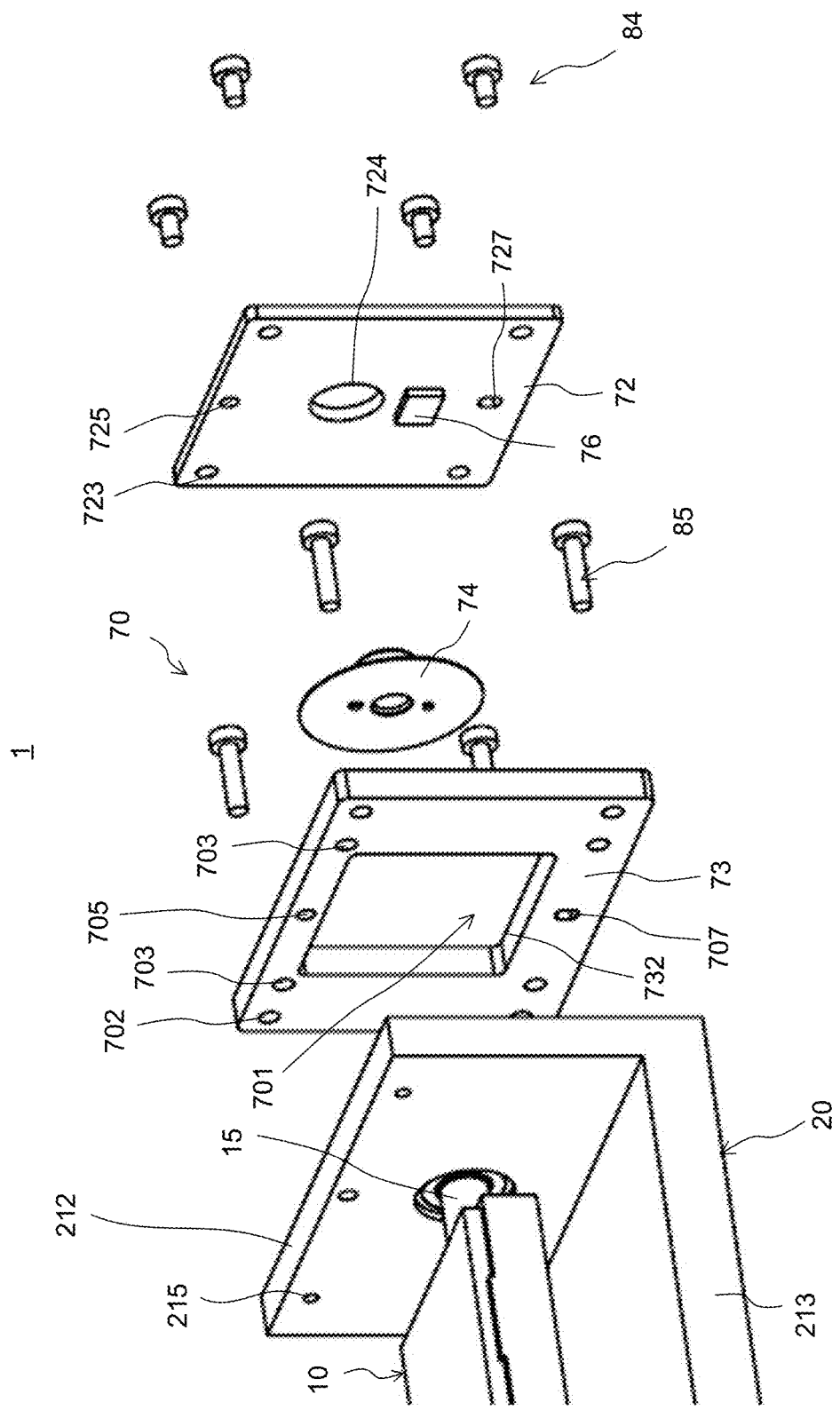
FIG. 14 is a rear side exploded perspective view of the angle sensor part.

Core assembly 40 illustrated in FIGS. 3, 4, and 14 includes coils 44 and 45, bobbins 46 and 47 around which coils 44 and 45 are wound, core body 400, and rotational angle position holding portion 48.

In the present embodiment, core assembly 40 is formed in a block-like shape (specifically, a rectangular parallelepiped shape) of a rectangular frame shape in which magnetic poles 410a and 410b are disposed inside. Core assembly 40 is formed so as to surround, with the frame-shaped outer circumferential portion, magnetic poles 410a and 410b disposed inside the outer circumferential portion. Core assembly 40 forms a single magnetic path that extends from and turns around, for example, each of magnetic poles 410a and 410b sandwiching magnet 32 in a rectangular region of the wall surface of wall portion 211 of base portion 21 as seen in the axial direction, and that surrounds magnetic poles 410a and 410b.

<Core Body 400>

Core body 400 forms a magnetic circuit including a magnetic path disposed to surround magnet 32 (and magnetic poles 410a and 410b). Core body 400 includes a plurality of magnetic poles 410a and 410b and first core (magnetic pole core) 41 with an integrated structure including a C-shaped magnetic path portion (connecting side portion 412 and lateral side portions 413), second core (bridging portion) 42 disposed to extend between one end portions of lateral side portions 413 of first core 41, frame-shaped third core (frame-shaped core) 43. Core body 400 is integrated by magnetically coupling together the first to third cores.

First to third cores 41 to 43 allow a magnetic flux generated during energization of coils 44 and 45 to pass through the plurality of magnetic poles 410a and 410b. First to third cores 41 to 43 are, for example, a laminated core formed by laminating electromagnetic steel plates such as silicon steel sheets (laminated members). By forming core body 400 in a laminated structure, it is possible to configure first to third cores 41 to 43 having a complicated shape at low cost.

<First Core 41>

First core 41 includes rod-shaped portions 411 (411a and 411b), connecting side portion 412, and lateral side portions 413. First core 41 includes a plurality of rod-shaped portions 411 (411a and 411b) that include, at their tip end portions, magnetic poles 410a and 410b facing each other, and are disposed parallel to each other. Connecting side portion 412 extending perpendicularly to rod-shaped portions 411 is connected to base end portions of the plurality of rod-shaped portions 411 (411a and 411b) respectively having opposed magnetic poles 410a and 410b at the tip end portions. Opposite lateral side portions 413a and 413b are perpendicularly disposed to protrude from the opposite end portions of connecting side portion 412. Connecting side portion 412 is provided with complementary pole portion 414 extending between rod-shaped portions 411a and 411b and parallel to rod-shaped portions 411a and 411b.

Rod-shaped portions 411 (411a and 411b), connecting side portion 412, lateral side portions 413 (413a and 413b), and complementary pole portion 414 have an integrated structure, and first core 41 is comb-shaped.

In rod-shaped portions 411a and 411b, the magnetic poles are disposed on the side surface portions of the tip end portions, respectively, and bobbins 46 and 47 are externally fitted to the outer circumferences of rod-shaped portions 411a and 411b on the base end portion side. Accordingly, coils 44 and 45 are disposed to be wound around rod-shaped portions 411a and 411b, respectively.

When excited by energization of coils 44 and 45, the magnetic poles at the tip end portions of rod-shaped portions 411a and 411b have polarities corresponding to the energization directions. Each of the magnetic poles is disposed to face magnet 32, and each of the magnetic poles has a shape curved along the outer circumferential surface of magnet 32. These curved shapes are, for example, disposed to face each other in a direction perpendicular to the extending direction of rod-shaped portions 411a and 411b.

Rod-shaped portions 411a and 411b have, for example, an external dimension to which bobbins 46 and 47 can be externally fitted from the tip end side. Thus, bobbins 46 and 47 can be externally fitted from the tip end side of rod-shaped portions 411a and 411b in the extending direction, that is, from the tip end portions of magnetic poles 410a and 410b, and can be positioned so as to surround the rod-shaped portions at the positions on the base end portion side of rod-shaped portions 411a and 411b. Each of externally fitted bobbins 46 and 47 is disposed between lateral side portion 413 and complementary pole portion 414.

Connecting side portion 412 constitutes one side portion of rectangular-shaped core body 400, is connected to the base end portions of rod-shaped portions 411a and 411b, and is disposed to extend in a direction perpendicular to the parallel extension direction of rod-shaped portions 411a and 411b.

Connecting side portion 412 mainly connects the base end portions of rod-shaped portions 411a and 411b and opposite lateral side portions 413a and 413b. Opposite lateral side portions 413a and 413b are preferably in close contact with the opposite end portions of second core 42, but are disposed so that a gap is provided between opposite lateral side portions 413a and 413b and the opposite end portions of second core 42 in this embodiment.

Connecting side portion 412 and opposite lateral side portions 413a and 413b are disposed, together with second core 42, to be stacked on third core 43 in close contact with the third core in the axial direction.

Complementary pole portion 414 is disposed opposite to rotational angle position holding portion 48, and when magnet 32 attracts rotational angle position holding portion 48, the rotational angle position holding portion attracts another pole of magnet 32 to reinforce the attraction state of rotational angle position holding portion 48.

Specifically, complementary pole portion 414 is made of a magnetic material, and is disposed to, for example, together with magnetic poles 410a and 410b and rotational angle position holding portion 48, surround magnet 32 in four directions.

Complementary pole portion 414 generates a magnetic attraction force between itself and magnet 32 (specifically, with pole 32b), and moves pole 32b different from pole 32a attracted by rotational angle position holding portion 48 in magnet 32. The poles are moved to positions opposite to each other. By this action, complementary pole portion 414 cancels the axis-radial load acting on movable body 10 by the magnetic attraction force in rotational angle position holding portion 48. Note that "canceling the axis-radial load" also includes "configuring to cancel the axis-radial load."

Note that a complementary pole surface of complementary pole portion 414 facing the outer circumferential surface of magnet 32 is a curved surface corresponding to the shape of the outer circumferential surface of magnet 32, and has an entirely uniform gap from the outer circumferential surface of magnet 32. In addition, since complementary pole portion 414 is disposed in core assembly 40 so as to surround magnet 32 together with rotational angle position holding portion 48. Accordingly, a minimum space layout is achieved. Thus, it is possible to realize rotary reciprocating drive actuator 1 which is more miniaturized.

<Second Core 42>

Second core 42, together with first core 41, forms the magnetic path disposed to surround the magnetic poles of the tip end portions of rod-shaped portions 411a and 411b from four sides. Second core 42 is formed in a prismatic shape, and forms the magnetic path through which magnetic flux passes through magnetic poles 410a and 410b when coils 44 and 45 are energized.

Second core 42 has the same thickness (axial length) as opposite lateral side portions 413a and 413b.

Figure 13:
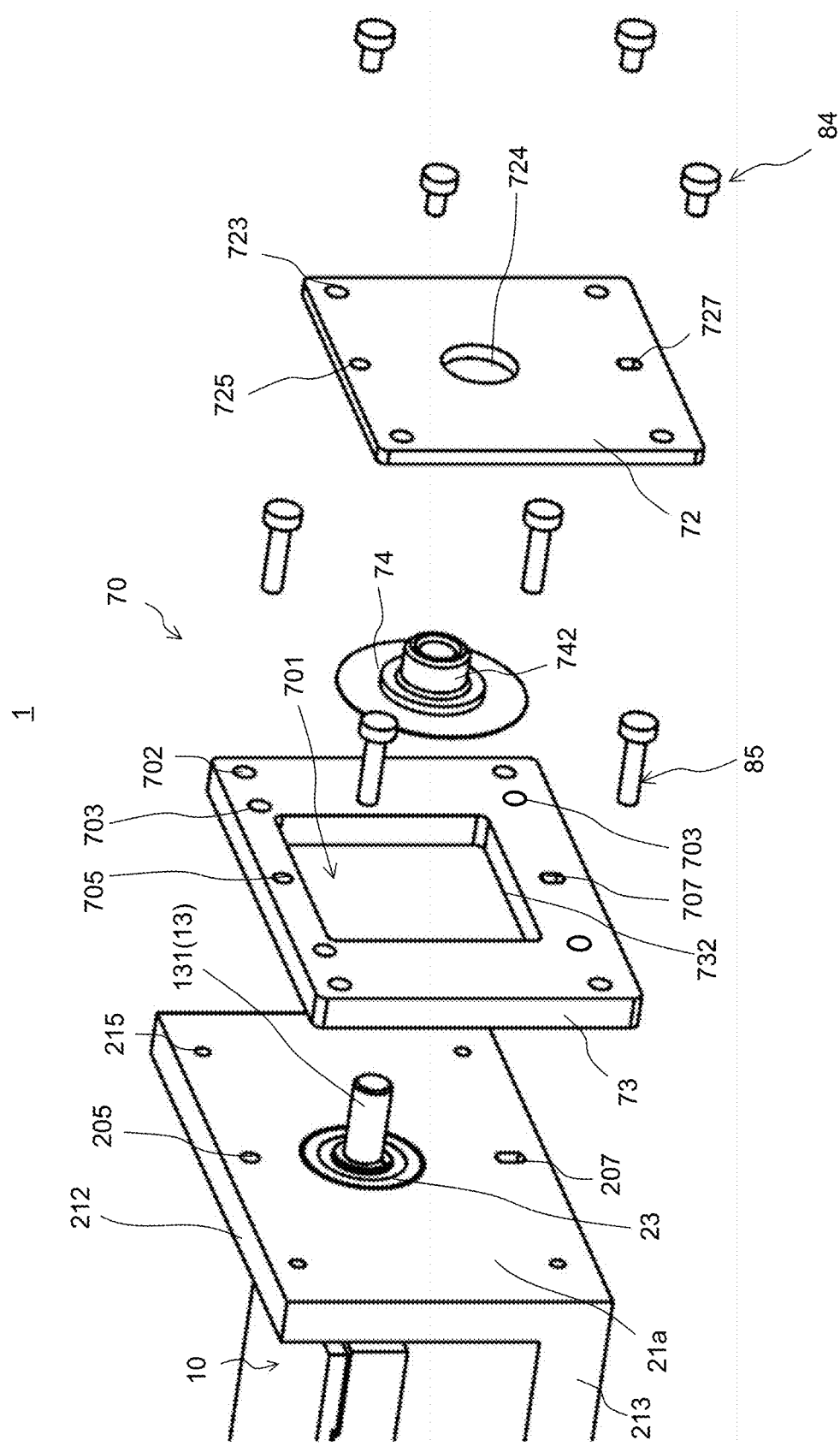
FIG. 13 is a front side exploded perspective view of the angle sensor part.

Second core 42 is fixed to bottom cover 50 and top cover 60 while being in close contact with third core 43 via fastening members 86 inserted into attachment holes (fastening holes) 402 similar to attachment holes (fastening holes) 402 disposed in the opposite end portions of the connecting side portion of first core 41 (see FIG. 13). Attachment holes 402 have the same diameter as through-holes 54 in bottom cover 50 and are formed so as to extend in parallel with rotation shaft 13.

Rotational angle position holding portion 48 is attached to second core 42 at a central portion in the extending direction and at a portion facing magnet 32. Another core is disposed to be joined to the opposite end portions of second core 42, and second core 42 is disposed at such a position that second core 42 and the other core surround magnet 32 and magnetic poles 410a and 410b.

<Third Core 43>

Together with connecting side portion 412, lateral side portions 413 of first core 41, and second core 42, third core 43 forms the magnetic path that surrounds the plurality of magnetic poles and connects the plurality of magnetic poles.

Third core 43 has a rectangular frame plate shape, and is attached in surface contact with the rectangular frame-shaped portion formed by both of first core 41 and second core 42.

Specifically, third core 43 faces and makes surface contact with connecting side portion 412 and opposite lateral side portions 413a and 413b of first core 41 in the extending direction of rotation shaft 13. In addition, third core 43 is assembled to first core 41 in a state where the plurality of magnetic poles on rod-shaped portions 411a and 411b of first core 41 are positioned around rotation shaft 13. In addition, third core 43 faces and makes surface contact with second core 42 in the extending direction of rotation shaft 13.

Thus, third core 43 is disposed around rotation shaft 13 so as to surround the magnetic poles and coils 44 and 45 of rod-shaped portions 411a and 411b, and forms a seamless magnetic path around rotation shaft 13. First to third cores 41 to 43 have a surrounding portion surrounding coils 44 and 45, and can form a flow of magnetic flux passing from one magnetic pole to the other magnetic pole of first core 41+third core 43, third core 43, third core 43+second core 42, and third core 43+first core 41 in this order. Further, since first to third cores 41 to 43 annularly surround the magnetic poles and magnet 32 between the magnetic poles, it is possible to prevent contact with coils 44 and 45 from the outside.

After driving unit 4 is assembled, rotation shaft 13 is inserted into a space surrounded by the magnetic poles. Further, magnet 32 attached to rotation shaft 13 is located in this space, and the magnetic poles face magnet 32 via air gap G at an accurate position.

Magnet 32 is a ring-type magnet in which S pole 32a and N pole 32b are alternately disposed in the circumferential direction. Magnet 32 is attached to the circumferential surface of rotation shaft 13 so as to be located in the space surrounded by magnetic poles 410a and 410b of core body 400 after rotary reciprocating drive actuator 1 is assembled. Magnet 32 is fixed so as to surround the outer circumference of rotation shaft 13. When coils 44 and 45 are energized, first core 41, second core 42, and third core 43 including rod-shaped portions 411a and 411b are energized, and magnetic poles 410a and 410b have the polarities corresponding to the energization directions. As a result, magnetic forces (attractive force and repulsive force) are generated between magnetic poles 410a and 410b and magnet 32.

In the present embodiment, magnet 32 is magnetized to different polarities changed at a plane along the axial direction of rotation shaft 13 serving as a boundary. That is, magnet 32 is a two-pole magnet magnetized so as to be equally divided into S pole 32a and N pole 32b. The number of magnetic poles of magnet 32 (two in the present embodiment) is equal to the number of magnetic poles 410a and 410b of core body 400. Note that magnet 32 may be magnetized to have two or more poles depending on the amplitude at the time of movement. In this case, magnetic pole portions of core body 400 are disposed correspondingly to the magnetic poles of magnet 32.

<Magnet 32>

The polarities of magnet 32 are switched at boundary portions 32c and 32d between S pole 32a and N pole 32b (hereinafter referred to as "magnetic pole switching portions"). Magnetic pole switching portions 32c and 32d are formed in a groove-like shape extending through the axial center in one end face of magnet 32. Magnetic pole switching portions 32c and 32d respectively face magnetic poles 410a and 410b when magnet 32 is held in a neutral position.

Magnetic pole switching portions 32c and 32d function as a reference for positioning the components of the sections when rotary reciprocating drive actuator 1 is assembled.

In particular, since magnet 32 is fixed to rotation shaft 13, it is possible to adjust and determine the positional relation between mirror part 12 and a sensor component while bringing a jig into contact with grooves of magnetic pole switching portions 32c and 32d in the axial direction to limit the rotation of magnet 32. Further, since rotation shaft 13 serving as the center of rotary reciprocating drive actuator 1 can be defined as a reference, the dimensions of other components can be easily set and can be manufactured with high accuracy.

When magnetic pole switching portions 32c and 32d are formed in a groove shape, the positional relation between the components fixed to rotation shaft 13 can be adjusted with respect to the groove at the time of assembly or maintenance of rotary reciprocating drive actuator 1. In particular, the position of mirror part 12, the attachment position of an encoder of angle sensor part 70, and the like can be appropriately and accurately defined with respect to rotation shaft 13 in accordance with the positions of magnetic pole switching portions 32c and 32d of magnet 32. For example, a jig is brought into contact with the groove in the axial direction, and a projection is fitted to the groove to restrict the rotation of rotation shaft 13 around the axis to make the jig immovable. Accordingly, a reference position for other components to be attached to rotation shaft 13 is obtained. In particular, accuracy is required to adjust the angle of magnet 32 of the mirror with respect to the poles, and this accuracy is made possible.

In the neutral position, magnetic pole switching portions 32c and 32d of magnet 32 face magnetic poles 410a and 410b, and thus, driving unit 4 can generate the maximum torque and stably drive movable body 10.

Further, by configuring magnet 32 with a two-pole magnet, the magnet cooperates with core body 400 to easily drive a movable object at a high amplitude, to improve the driving performance. That is, mirror part 12, which is the movable target, can be driven at a wide angle. Note that although the embodiment has been described in connection with the case where magnet 32 has a pair of magnetic pole switching portions 32c and 32d, two or more pairs of magnetic pole switching portions may be included.

<Coil Body (Coil and Bobbin)>

Coils 44 and 45 are wound around cylindrical bobbins 46 and 47. Coil bodies composed of coils 44 and 45 and bobbins 46 and 47 are externally fitted to rod-shaped portions 411a and 411b of first core 41. Thus, coils 44 and 45 are disposed to be wound around rod-shaped portions 411a and 411b. Thus, coils 44 and 45 are disposed adjacently to the magnetic poles of the tip end portions of rod-shaped portions 411a and 411b.

The winding directions of coils 44 and 45 are set such that magnetic flux is appropriately generated from one of the plurality of magnetic poles of first core 41 toward the other when energization is performed.

Figure 8:
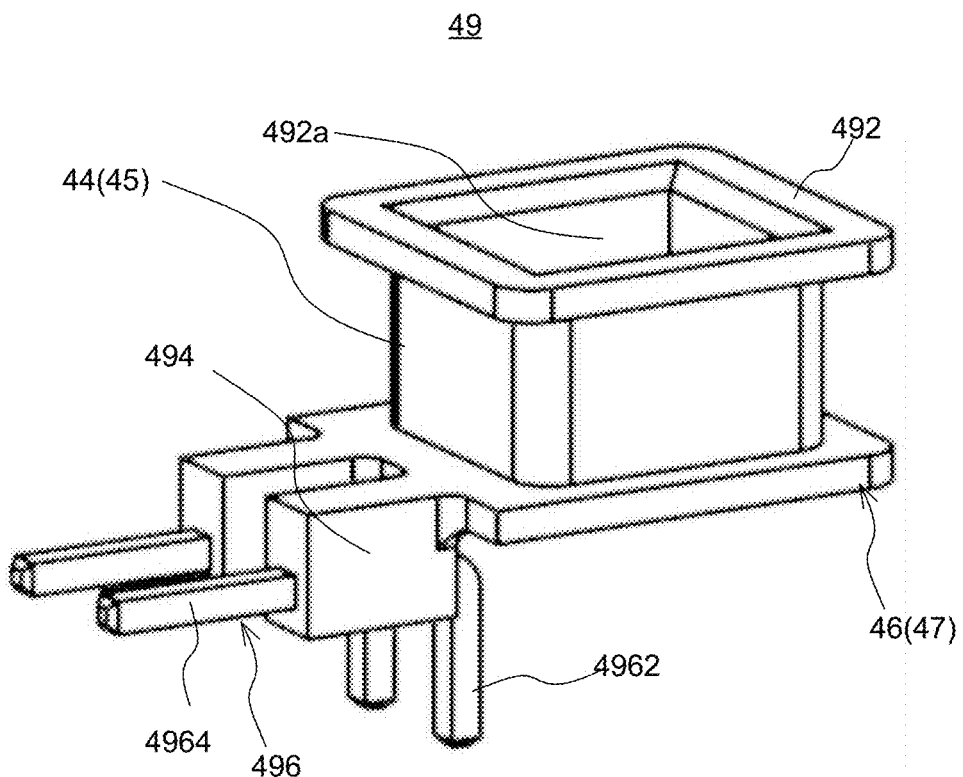
FIG. 8 is a perspective view of a coil body.
Figure 9:
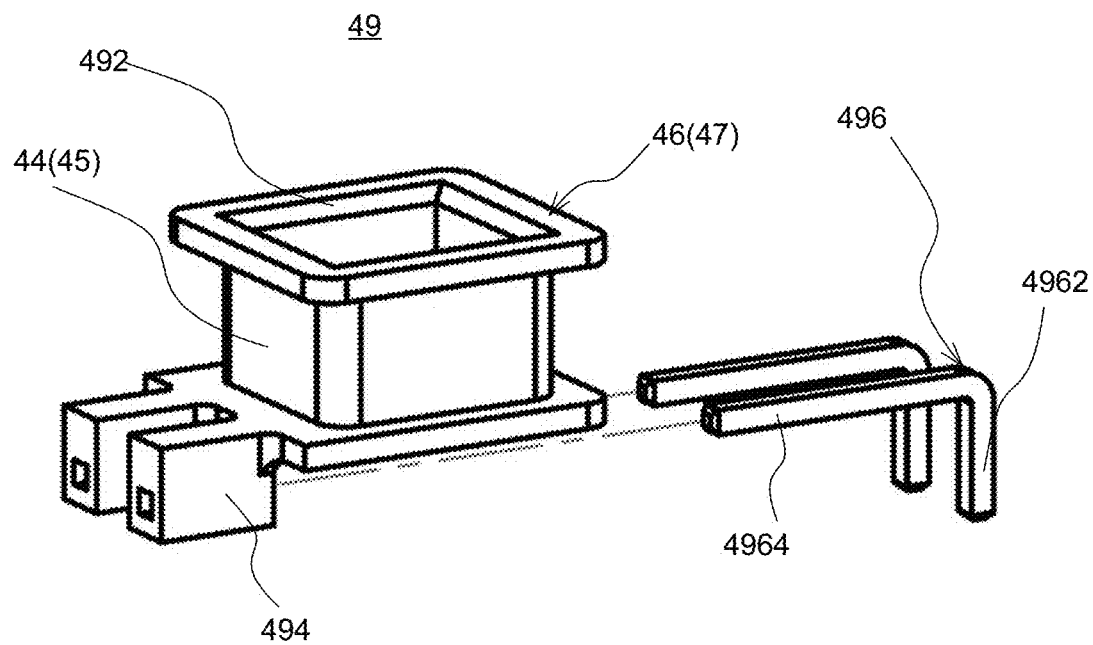
FIG. 9 is an exploded view of the coil body.
Figure 10:
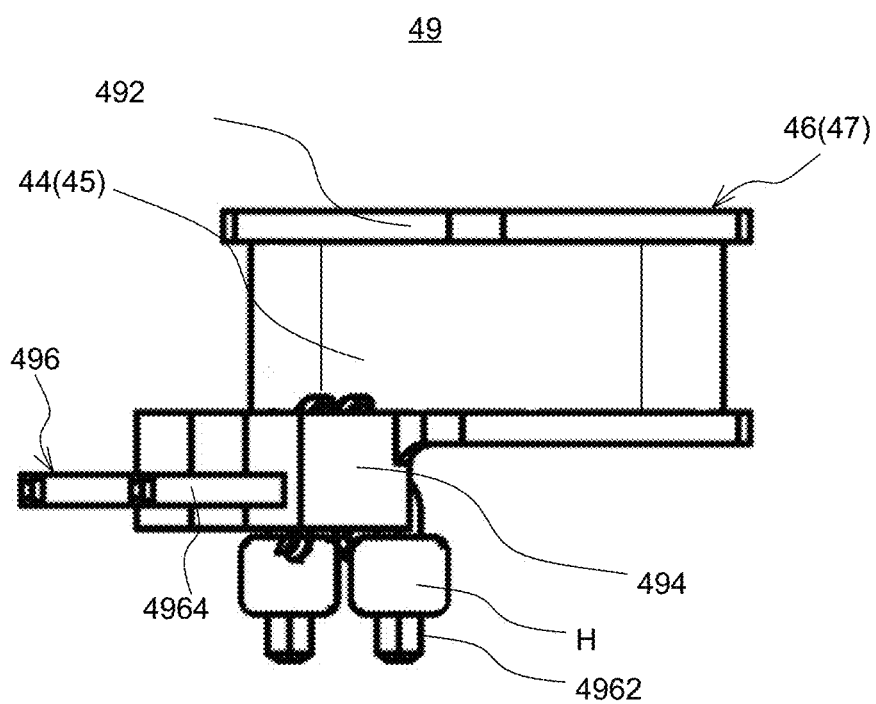
FIG. 10 is a perspective view illustrating a connection state of a coil in the coil body.

FIG. 8 is a perspective view of a coil body, FIG. 9 is an exploded view of the coil body, and FIG. 10 is a perspective view illustrating a connection state of coils in the coil body.

Since the configuration of the coil body being bobbin 46 around which coil 44 is wound and the configuration of the coil body having bobbin 47 around which coil 45 is wound are the same, a description will be given of the coil body having bobbin 46 around which coil 44 is wound, and the description of the coil body having coil 45 and bobbin 47 will be omitted.

Coil body 49 includes bobbin portion 492 around which coil 44 is wound, and terminal support portions 494 that support terminals 496 and is integrally disposed with bobbin portion 492.

Bobbin portion 492 includes a through-hole through which rod-shaped portion 411 (411a or 411b) is inserted, and terminal support portions 494 are disposed to protrude from a flange of an opening edge portion on one side of bobbin portion 492.

Terminal support portions 494 have a rectangular cylindrical shape, and terminals 496 are inserted therein. The terminal support portions hold terminals 496.

Terminals 496 have an L-shape. The end portions of coil 44 are tied to be connected with one side portions 4962. The base end portions of other side portions 4964 are inserted into and supported by terminal support portions 494. The tip end portion side of other side portions 4964 protrudes to the outside from terminal support portions 494.

The tip end portion side of each of other side portions 4964 is connected to an external device that supplies power to coil 44, or is connected to an end portion of an adjacent coil. In the present embodiment, in each of terminals 496, the extending direction of one side portion 4962 is parallel to the axial direction of coil 44, and the extending direction of other side portion 4964 is perpendicular to the axial direction of coil 44.

In coil body 49, one side portions 4962 of terminals 496 are disposed to extend in the opening direction of the opening portion of bobbin portion 492, and other side portions 4964 are disposed to extend in the protruding direction of the flange of bobbin portion 492.

In one side portions 4962, coil wires of the opposite ends of coil 44 are connected respectively to connection portions H made of solder or the like.

As described above, terminals 496 have an L-shape, and coil windings are connected to one side portions 4962 that are one side portions (connection portions H that are a fillet), and are joined to sensor board 72 at other side portions 4964.

Since each of terminals 496 is L-shaped, connection of the sensor board connection side and connection of the coil connection side can be made separately. In particular, a work for forming connection portions (fillets) H for connecting the coil windings by solder can be easily performed without interference of the solder and the winding.

That is, even when the work of fixing the same winding of terminal 496 as in the attaching work of attaching sensor board 72 occurs, the attaching work of attaching sensor board 72 does not serve as a hindrance factor against a connection process of connecting the board to terminal 496, such as solder adherence during insertion of the winding. The connection between the board and terminal 496 can be performed while a contamination countermeasure for driving unit 4 is being taken.

<Rotational Angle Position Holding Portion (Magnet Position Holding Portion) 48>

Rotational angle position holding portion 48 illustrated in FIGS. 2 to 4 is incorporated in core assembly 40 so as to face magnet 32 via air gap G in a state in which rotary reciprocating drive actuator 1 is assembled. For example, rotational angle position holding portion 48 is attached to second core 42 in an attitude in which the magnetic pole faces magnet 32.

Rotational angle position holding portion 48 uses, for example, a magnet having a magnetic pole directed toward magnet 32 to generate a magnetic attraction force between the magnet and magnet 32, and attracts magnet 32. That is, rotational angle position holding portion 48, together with rod-shaped portions 411a and 411b, forms a magnetic spring between the rotational angle position holding portion and magnet 32. The magnetic spring maintains the rotational angle position of magnet 32, that is, the rotational angle position of rotation shaft 13 at the neutral position in a normal state (in a non-energized state) in which coils 44 and 45 are not energized.

At this time, magnetic pole 32b (the N pole illustrated in FIG. 3) of magnet 32 attracting rotational angle position holding portion 48, which is opposed to magnetic pole 32a (the S pole in FIG. 3), attracts complementary pole portion 414 of first core 41, which is a magnetic material in close proximity. Thus, magnet 32, that is, mirror part 12, which is the movable object, is more effectively held at the neutral position.

The neutral position is a reference position of the reciprocating rotation operation of magnet 32, that is, a center position of the reciprocating rotation (swing), and is a position at which the same rotational angle is achieved during right and left reciprocating rotation around the axis. When magnet 32 is held in the neutral position, magnetic pole switching portions 32c and 32d of magnet 32 face the magnetic poles of rod-shaped portions 411a and 411b.

Further, the attachment attitude of mirror part 12 is adjusted with reference to the state in which magnet 32 is in the neutral position. Note that, rotational angle position holding portion 48 may be formed of a magnetic material that generates a magnetic attraction force between the rotational angle position holding portion and magnet 32.

<Bottom Cover 50 and Top Cover 60>

Bottom cover 50 and top cover 60 illustrated in FIGS. 1, 2, 4 to 6, and 11 to 14 are preferably made of an electrically conductive material having a non-magnetic property and having high electric conductivity, and function as an electromagnetic shield.

Bottom cover 50 and top cover 60 are disposed on opposite sides of core assembly 40 in the axial direction (thickness direction).

Bottom cover 50 and top cover 60 can suppress the incidence of noise to core assembly 40 and the emission of noise from core body 400 to the outside.

Bottom cover 50 and top cover 60 are made of, for example, a non-magnetic material such as an aluminum alloy, having electrical conductivity and high thermal conductivity. The aluminum alloy has a high degree of freedom in design, and can easily impart desired rigidity. Therefore, when bottom cover 50 and top cover 60 are made of an aluminum alloy, top cover suitably functions as a support for supporting rotation shaft 13.

Figure 11:
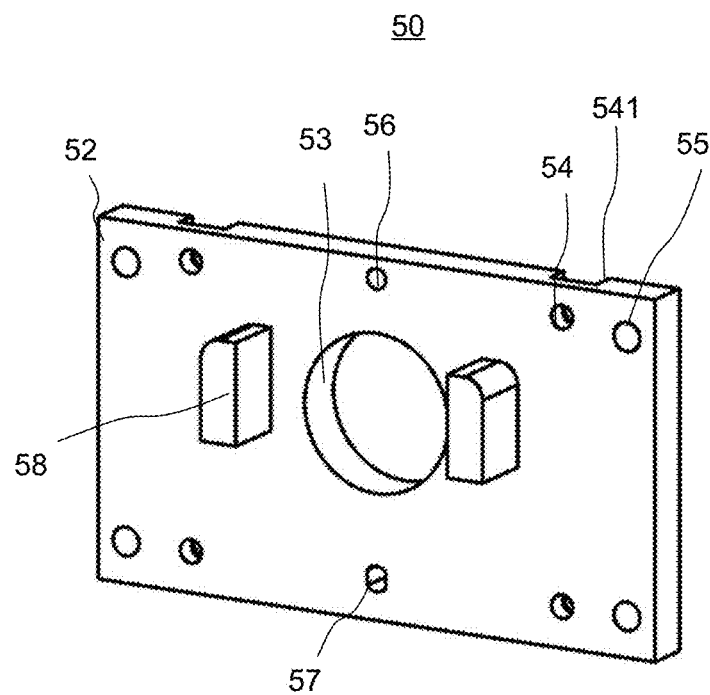
FIG. 11 is a front perspective view of a bottom cover.

FIG. 11 is a front side perspective view of a bottom cover. Bottom cover 50 is attached so as to overlap the outer surface of wall portion 211. Bottom cover 50 is formed in a rectangular plate shape corresponding to the outer shape of wall portion 211. Bottom cover has rectangular plate-shaped cover main body 52, and opening portion 53 through which rotation shaft 13 is inserted is formed in a central portion of cover main body 52. Opening portion 53 is disposed at a position facing bearing 22, and an inner diameter of opening portion 53 is larger than an outer diameter of magnet 32. In bottom cover 50, rotation shaft 13 on which magnet 32 is mounted is inserted into opening portion 53, and magnet 32 can be disposed in core assembly 40 by insertion.

Preload spring 35 in which rotation shaft 13 is inserted and which is externally fitted to rotation shaft 13 is disposed in opening portion 53 (see FIG. 2).

Cover main body 52 of bottom cover 50 is provided with through-holes 54, through-holes 55 for fixation to base portion 21, positioning hole 56, position adjustment hole 57, and core holding projections 58. Fastening members 86 for integrating bottom cover 50, core assembly 40, and top cover 60 into driving unit 4 are inserted into through-holes 54. Through-holes 55 are formed in attachment portions 522 attached to wall portion 211. Note that attachment portions 522 form left and right side portions of cover main body 52 that are apart from each other in a direction orthogonal to the axial direction, and include four corner portions of cover main body 52. Through-holes 55 are formed respectively in the corners.

Opening portion 53, through-holes 54 and 55, positioning hole 56, and position adjustment hole 57 are formed parallel to the axial direction of rotation shaft 13. Fastening members 81 and 86 can be inserted through through-holes 54 and 55 for assembly to base portion 21 or for assembly of driving unit 4, and thus for assembly of rotary reciprocating drive actuator 1 in one axial direction.

Figure 7:
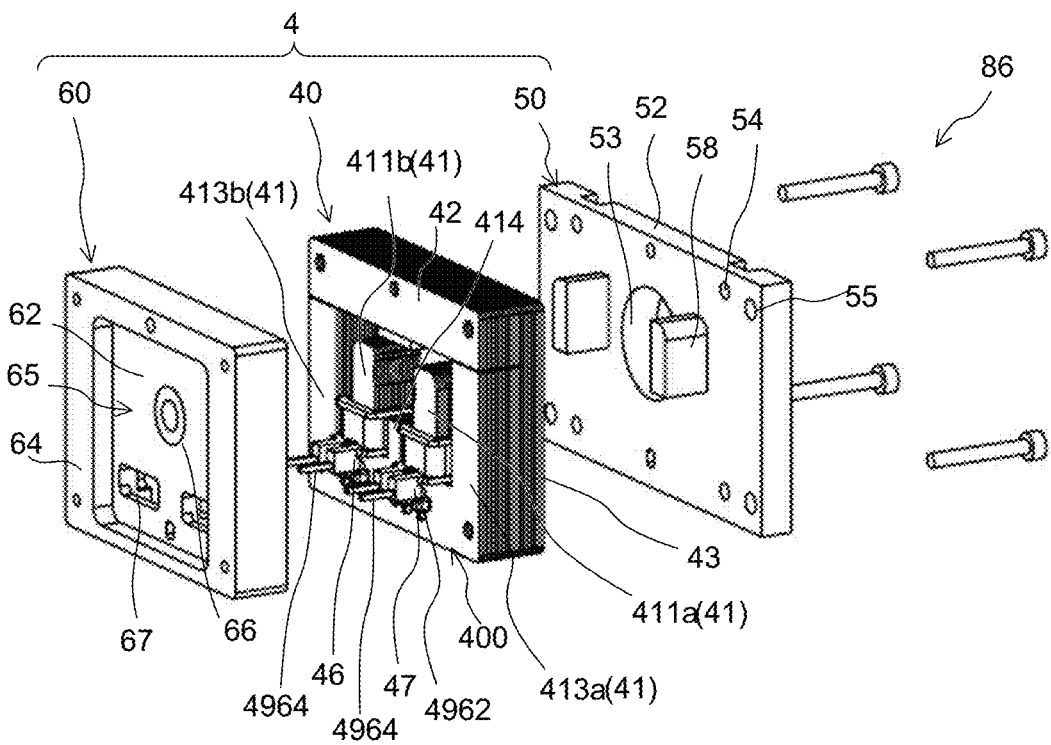
FIG. 7 is an exploded perspective view of the driving unit.

As illustrated in FIGS. 7 and 11, in each of through-holes 54, recessed spot-facing portion 541 is formed in the rear surface of cover main body 52, and spot-facing portion 541 accommodates the head portion of fastening member 86 such as a screw.

Core holding projections 58 are disposed to protrude in the axial direction at positions sandwiching opening portion 53 in cover main body 52, and are fitted to and position core assembly 40 when combined with core assembly 40. (See FIGS. 3 and 4)

Core holding projections 58 are inserted between rod-shaped portions 411a and 411b and opposite lateral side portions 413a and 413b to prevent leakage of magnetic flux flowing therebetween.

As illustrated in FIG. 6, positioning projection 59 is disposed to protrude from the rear surface of bottom cover 50. Positioning projection 59 is engaged with recessed portion 218 (see FIGS. 2 and 4) formed in wall portion 211 when bottom cover 50 makes contact with base portion 21 in a state where the centers thereof coincide with each other.

Positioning projection 59 is, for example, an annular projection. On the other hand, as illustrated in FIGS. 2 and 4, recessed portion 218 of wall portion 211 is an annular groove formed so as to surround insertion hole 211a in base portion 21. Positioning projection 59 is engaged with recessed portion 218 being the annular groove, and both of wall portion 212 and driving unit 4 are positioned.

Top cover 60 and bottom cover 50 sandwich core assembly 40 from opposite sides in the axial direction, and are integrally fixed by fastening members 86 to form driving unit 4. As illustrated in FIGS. 2 and 4, top cover 60 of the present embodiment functions as sensor housing 65 that houses optical sensor 76 that detects the rotational angle of movable body 10, that is, rotation shaft 13.

Top cover 60 includes top cover main body 62 that covers the surface of core assembly on the front end side, and circumferential wall portion 64 that protrudes from the outer circumferential edge portion of top cover main body 62 toward the other end portion 132 side in the axial direction.

Top cover main body 62 as seen in the axial direction is a plate-shaped body having a square shape and having depressed portion 621 that opens toward the core assembly 40 side. Top cover main body 62 is a square plate-like body, and circumferential wall portion 64 is formed in a rectangular frame shape that extends upright from the outer circumferential portion of top cover main body 62.

Through-hole 66 is disposed in top cover main body 62 of top cover 60. Through-hole 66 is disposed in top cover main body 62 coaxially with opening portion 53 in bottom cover 50 and bearings 22 and 23 of base portion 21. Bushing 39 through which rotation shaft 13 is inserted is internally fitted to through-hole 66 from the back surface side (one end portion 131 side). Thus, bushing 39 is attached to top cover main body 62 in a state in which the movement direction is restricted. Note that bushing 39 and rotation shaft 13 may be disposed to slide with each other, or may be disposed to have a gap therebetween.

Bushing 39 supports the other end portion 132 side of rotation shaft 13. Bushing 39 is supported by top cover 60 on the other end portion 132 side such that rotation shaft 13 is not shaken by an impact caused when rotation shaft 13 receives the impact. Bushing 39 is attached to top cover 60 such that the other end portion of the bushing is internally fitted to through-hole 66 and one end portion thereof is located in depressed portion 621.

In addition to through-hole 66, bobbin engaging holes 67 that are engaged with bobbins 46 and 47 are disposed in top cover main body 62 to extend through top cover main body 62 in the axial direction.

Terminal support portions 494 of coil body 49 having bobbins 46 and 47 are internally fitted to bobbin engaging holes 67. As a result, terminal support portions 494 are inserted into top cover main body 62, and other side portions 4964 are disposed to protrude from terminal support portion 494.

The engagement between bobbin engaging holes 67 and terminal support portions 494 also functions as positioning during assembly of core assembly 40 and top cover 60.

Top cover 60, core assembly 40 (core body 400), and bottom cover 50 are fixed by fastening members 86 via the holes having the same diameter and being axially continuous to one another, such as fastening holes 722, attachment holes 402, and through-holes 54.

<Angle Sensor Part 70>

Figure 12:
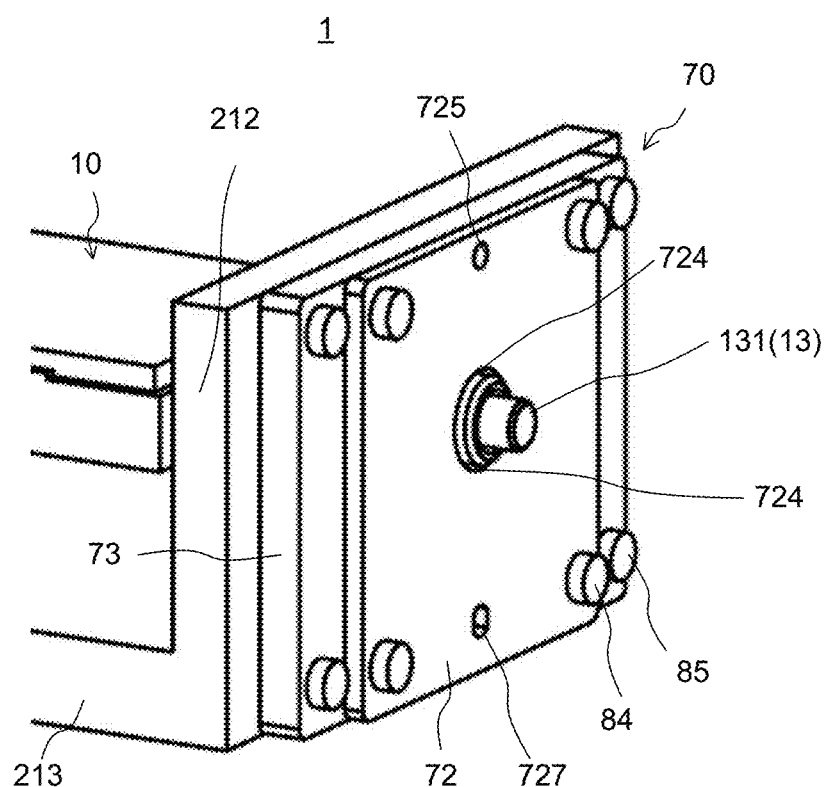
FIG. 12 is an external perspective view of an angle sensor part in the rotary reciprocating drive actuator.

FIG. 12 is an external perspective view of the angle sensor part in rotary reciprocating drive actuator 1, FIG. 13 is a front side exploded perspective view of the angle sensor part, and FIG. 14 is a rear side exploded perspective view of the angle sensor part.

Angle sensor part 70 is disposed on outer surface 21a of wall portion 212 at one end portion side of base portion 21.

Angle sensor part 70 detects a rotational angle of movable body 10 including magnet 32 and rotation shaft 13 (also mirror part 12). Rotary reciprocating drive actuator 1 can control the rotational angle position and the rotation speed of the movable body, specifically, of mirror part 12, which is a movable object, at the time of driving via a control part based on the detection result of angle sensor part 70.

Angle sensor part 70 may be a sensor of any type such as a magnetic type or an optical type. In the present embodiment, angle sensor part 70 includes sensor components, sensor board 72, and board holding portion 73.

The sensor components included in angle sensor part 70 are, for example, encoder disk 74 and optical sensor 76 that includes a light source, a light receiving element, and the like. Optical sensor 76 is mounted on, for example, sensor board 72.

Board holding portion 73 holds attached sensor board 72. Board holding portion 73, together with sensor board 72 and wall portion 212, forms a placement space (sensor placement portion 701) in which the sensor components are disposed.

Board holding portion 73 is, for example, a plate-like body including opening portion 732 at the center thereof. Board holding portion 73 is fixed to outer surface 21a of wall portion 212, and inside opening portion 732 forms recessed sensor placement portion 701 through which rotation shaft 13 is inserted. Sensor board 72 is attached to board holding portion 73 to cover an internal space (which is an inside opening portion and forms sensor placement portion 701). As a result, board holding portion 73 can accommodate the sensor components in a state in which contamination is prevented.

Board holding portion 73 is formed in a frame shape, but is not limited thereto, and may be formed in a recess shape as long as rotation shaft 13 is inserted therethrough and as long as board holding portion 73 forms a space in which the sensor components can be disposed. Board holding portion 73 is fixed to wall portion 212 by inserting and fitting (for example, screwing) fastening members 85 that pass through fastening holes 702 into fastening holes 215 in wall portion 212.

Encoder disk 74 is fixed to the one end portion 131 side of rotation shaft 13 via central attachment portion (encoder hub) 742 (see FIG. 13), and is disposed in opening portion 732 (in sensor placement portion 701) in board holding portion 73.

Encoder disk 74 is for detecting the number of revolutions of rotation shaft 13, and rotates integrally with magnet 32 and mirror part 12. The rotational position around the axis of encoder disk 74 is the same as the rotational position of rotation shaft 13 around the axis.

Optical sensor 76 is disposed to face encoder disk 74 (to face it in the axial direction of rotation shaft 13). Optical sensor 76 emits light to encoder disk 74 and detects the rotational position (angle) of the encoder disk based on the reflected light. Thus, optical sensor 76 can detect an accurate rotational position of magnet 32 and mirror part 12 at a high resolution.

Optical sensor 76 is mounted on the rear surface of sensor board 72. By attaching sensor board 72 to board holding portion 73, optical sensor 76 is disposed in sensor placement portion 701 so as to face encoder disk 74 in the axial direction. Optical sensor 76 is disposed in optical sensor placement portion 701 with respect to encoder disk 74 so as to be capable of detecting the rotation speed and the rotation position of encoder disk 74.

Sensor board 72 is disposed on board holding portion 73 disposed on outer surface 21a of wall portion 212 so as to close opening portion 732 in board holding portion 73 from one end portion 131 side, and forms closed sensor placement portion 701. Sensor board 72 is attached to other wall portion 212 of the pair of wall portions 211 and 212, and the sensor (optical sensor 76) that detects the rotational angle of one end portion 131 of rotation shaft 13 is mounted on sensor board 72. Sensor board 72 is disposed such that optical sensor 76 faces wall portion 212 from the axially outer surface side of wall portion 212 and detects the rotational angle of one end portion 131.

Sensor board 72 includes opening portion 724 in a central portion thereof, and attachment shaft part (encoder hub) 742 for attachment of encoder disk 74 and rotation shaft 13 are inserted into opening portion 724. Sensor board 72 is capable of supporting attachment shaft part 742 and rotation shaft 13. Fastening members 84 are fixed to fastening holes 703 in board holding portion 73 via fastening holes 723, so that sensor board 72 is fixed to board holding portion 73. Accordingly, sensor board 72 is fixed to board holding portion 73 fixed to wall portion 212, and thus is fixed to wall portion 212 via board holding portion 73.

Positioning holes 205, 705, and 725 and position adjustment holes 207, 707, and 727 used for positioning and fixing angle sensor part 70 to wall portion 212 at a suitable position are provided in wall portion 212, board holding portion 73, sensor board 72.

Positioning holes 205, 705, and 725 having the same diameter (including substantially the same diameter) are disposed on the coincident axes parallel to rotation shaft 13. Position adjustment holes 207, 707, and 727 are disposed on the coincident axes parallel to rotation shaft 13 to have the same shape, which is a shape that forms a gap from a rod-shaped adjustment member (not illustrated) inserted through the position adjustment holes.

With these configurations, the adjustment member (not illustrated) is inserted into position adjustment holes 207, 707, and 727 before wall portion 212, board holding portion 73, and sensor board 72 are fastened to one another by fastening members 84. In this state, a rod-shaped positioning member can be inserted through each of positioning holes 205, 705, and 725 while wall portion 212, board holding portion 73, and sensor board 72 are moved and adjusted to suitable positions. As a result, board holding portion 73 and sensor board 72 are positioned at the suitable positions around rotation shaft 13 with respect to wall portion 212. In this state, board holding portion 73 and sensor board 72 can be fixed to wall portion 212 at the suitable positions.

Sensor board 72 is fixed to board holding portion 73 via fastening members 84 inserted through fastening holes 703, such that mounted optical sensor 76 faces encoder disk 74 in the axial direction of rotation shaft 13 within opening portion 732.

Only by attaching sensor board 72 to board holding portion 73, it is possible to prevent intrusion of unnecessary matters such as dust from the outside into a sensing portion of angle sensor part 70 including optical sensor 76 and encoder disk 74.

Figure 15:
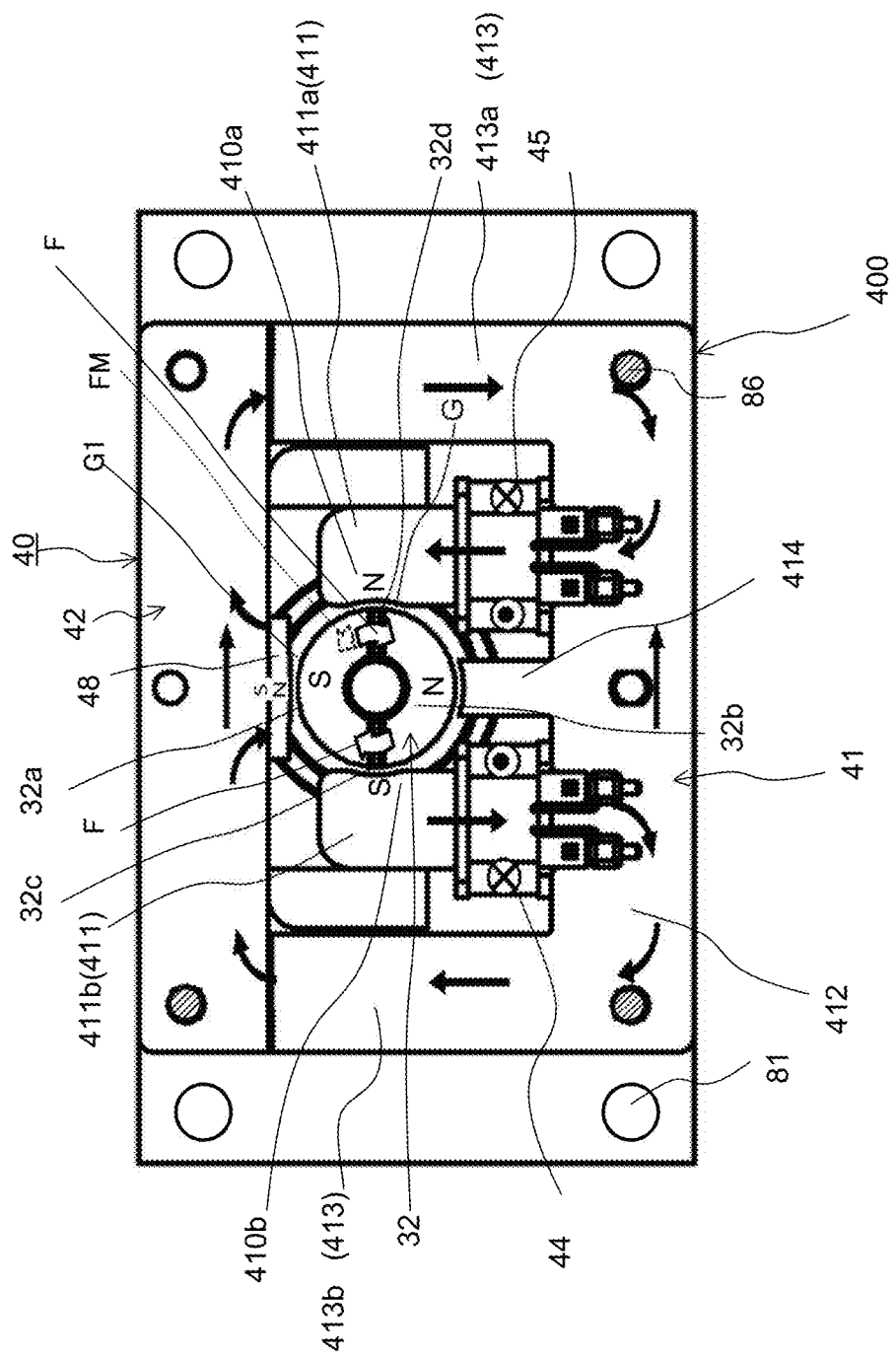
FIG. 15 is a view for explaining the operation of the magnetic circuit of the rotary reciprocating drive actuator.

Next, the operation of rotary reciprocating drive actuator 1 will be described with reference to FIGS. 3 and 15. FIG. 15 is a diagram for explaining the operation of the magnetic circuit of rotary reciprocating drive actuator 1.

Magnetic poles 410*a* and 410*b* of two rod-shaped portions 411*a* and 411*b* of core body 400 of core assembly 40 are disposed to sandwich magnet 32 with air gap G therebetween. When coils 44 and 45 are not energized, as illustrated in FIG. 3, magnet 32 is held in the neutral position by the magnetic attraction force between the magnet and rotational angle position holding portion 48.

Figure 20:
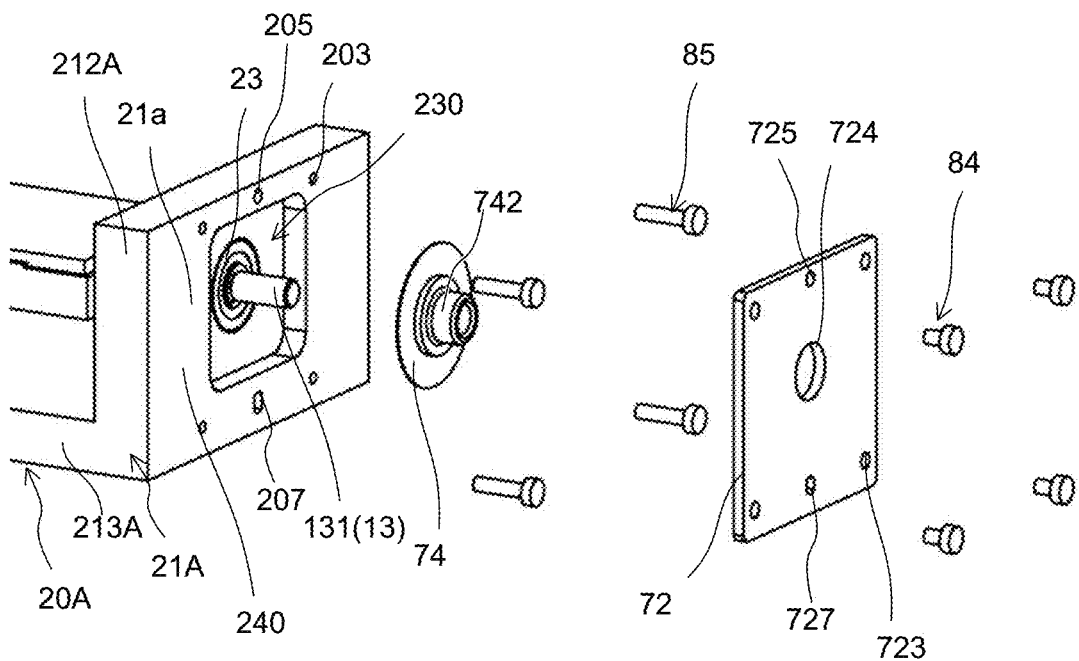
FIG. 20 is a front side exploded perspective view of a sensor part disposed on a wall portion on the same end portion side.

In this neutral position, one of S pole 32*a* and N pole 32*b* of magnet 32 (S pole 32*a* in FIG. 20) is attracted to rotational angle position holding portion 48 (see magnetic spring torque FM in FIG. 20). At this time, magnetic pole switching portions 32*c* and 32*d* face the center positions of magnetic poles 410*a* and 410*b* of core body 400. Further, complementary pole portion 414 is attracted to the other of S pole 32*a* and N pole 32*b* of magnet 32 (N pole 32*b* in FIG. 20). As a result, magnet 32 moves to the neutral position more effectively.

When coils 44 and 45 are energized, core body 400 is energized, and magnetic poles 410*a* and 410*b* have polarities corresponding to the energization directions. For example, when coils 44 and 45 are energized as illustrated in FIG. 20, a magnetic flux is generated inside core body 400, and magnetic pole 410*a* becomes the N pole and magnetic pole 410*b* becomes the S pole.

Thus, magnetic pole 410*a* magnetized to the N pole attracts S pole 32*a* of magnet 32, and magnetic pole 410*b* magnetized to the S pole attracts N pole 32*b* of magnet 32. Then, torque in direction F is generated in magnet 32 around the axis of rotation shaft 13, and magnet 32 rotates in direction F. Along with this, rotation shaft 13 also rotates in direction F, and mirror part 12 fixed to rotation shaft 13 also rotates in direction F.

Next, when coils 44 and 45 are energized in the opposite direction, the flow of the magnetic flux generated inside core body 400 is opposite to the direction illustrated in FIG. 15, and magnetic pole 410*a* becomes the S pole and magnetic pole 410*b* becomes the N pole. Magnetic pole 410*a* magnetized to the S pole attracts N pole 32*b* of magnet 32, and magnetic pole 410*b* magnetized to the N pole attracts S pole 32*a* of magnet 32. Then, torque −F in the direction opposite to direction F is generated in magnet 32 around the axis of rotation shaft 13, and magnet 32 rotates in direction −F. Along with this, rotation shaft 13 also rotates, and mirror part 12 fixed to rotation shaft 13 also rotates in the direction opposite to the direction illustrated in FIG. 15.

Rotary reciprocating drive actuator 1 causes reciprocating rotation of mirror part 12 by repeating the above-described operations.

Figure 21:
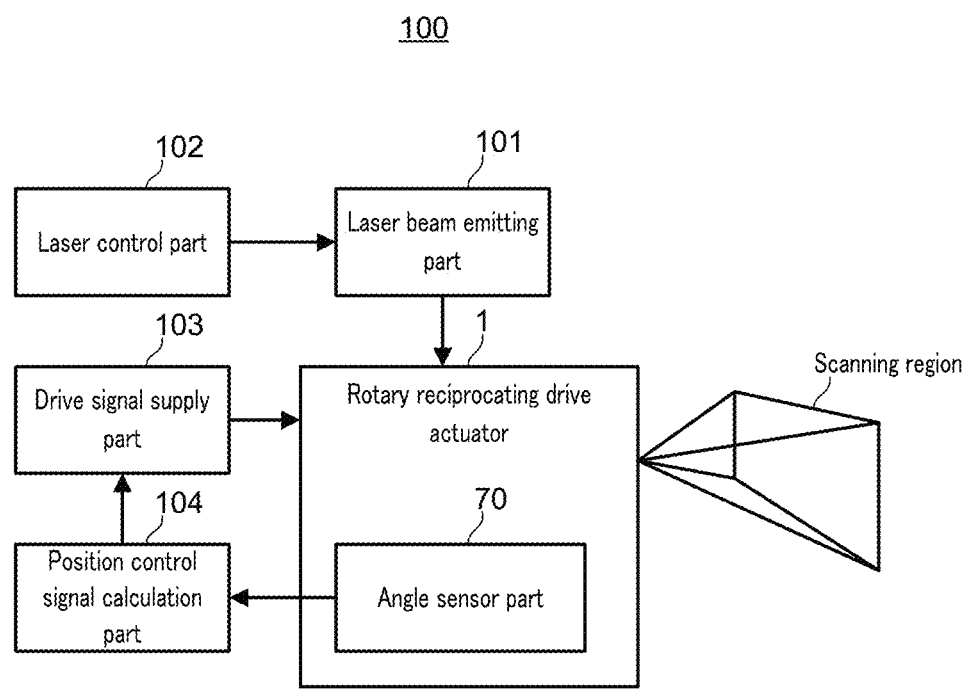
FIG. 21 is a diagram illustrating a configuration of a principal part of a scanner system using the rotary reciprocating drive actuator.

In practice, rotary reciprocating drive actuator 1 is driven by an AC wave input to coils 44 and 45 from a power supply part (for example, corresponding to the drive signal supply part 103 in FIG. 21). That is, the energization direction of coils 44 and 45 is periodically switched. When the energization direction is switched, magnet 32 is biased to return to the neutral position by the magnetic attraction force between rotational angle position holding portion 48 and magnet 32, that is, the restoring force of the magnetic spring ("—FM" which is the torque in the direction opposite to magnetic spring torque FM illustrated in FIG. 20). As a result, the torque in direction F and the torque in the direction opposite to direction F (direction −F) alternately act on movable body 10. Thus, movable body 10 is rotationally reciprocally driven.

The driving principle of rotary reciprocating drive actuator 1 will be briefly described below. In rotary reciprocating drive actuator 1 of the present embodiment, when the inertial moment of the movable body (movable body 10) is J [kg·m$^2$] and the spring constant in the torsional direction of the magnetic spring (magnetic poles 410*a* and 410*b*, rotational angle position holding portion 48, and magnet 32) is K$_{sp}$ [N·m/rad], the movable body vibrates (performs reciprocating rotation) with respect to the fixing body (fixing body 20) at resonant frequency F$_r$ [Hz] calculated as given by Expression 1.

[1]

$$Fr = \frac{1}{2\pi}\sqrt{\frac{K_{sp}}{J}} \qquad \text{(Expression 1)}$$

Fr: Resonant frequency [Hz]
J: Inertial moment [kg·m$^2$]
K$_{sp}$: Spring constant [N·m/rad]

Since the movable body is a mass in a vibration model of a spring-mass system, the movable body is brought into a resonance state when the AC wave of a frequency equal to resonant frequency F$_r$ of the movable body is input to coils 44 and 45. That is, the movable body can be efficiently vibrated by inputting the AC wave of a frequency being substantially equal to resonant frequency F$_r$ of the movable body to coils 44 and 45 from the power supply part.

The equation of motion and the circuit equation representing the driving principle of rotary reciprocating drive actuator 1 are illustrated below. Rotary reciprocating drive actuator 1 is driven based on the equation of motion represented by Expression 2 and the circuit equation represented by Expression 3.

[2]

$$J\frac{d^2\theta(t)}{dt^2} = K_t i(t) - K_{sp}\theta(t) - D\frac{d\theta(t)}{dt} - T_{Loss} \quad \text{(Expression 2)}$$

J: Inertial moment [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]
$T_{Loss}$: Loading torque [N·m]

[3]

$$e(t) = Ri(t) + L\frac{di(t)}{dt} + K_e \frac{d\theta(t)}{dt} \quad \text{(Expression 3)}$$

e(t): Voltage [V]
R: Resistance [Ω]
L: Inductance [H]
$K_e$: Counter electromotive force constant [V/(rad/s)]

That is, inertial moment J [kg·m²], rotational angle θ(t) [rad], torque constant $K_t$ [N·m/A], current i(t) [A], spring constant $K_{sp}$ [N·m/rad], damping coefficient D [N·m/(rad/s)], loading torque $T_{Loss}$ [N·m], and the like of the movable body in rotary reciprocating drive actuator 1 may be changed appropriately as long as Expression 2 is satisfied. In addition, voltage e(t) [V], resistance R [Ω], inductance L [H], and reverse electromotive force constant $K_e$ [V/(rad/s)] may be changed appropriately as long as Expression 3 is satisfied.

As is understood, rotary reciprocating drive actuator 1 can efficiently obtain large vibrational outputs when the coils are energized by an AC wave corresponding to resonant frequency $F_r$ determined by inertial moment J of the movable body and spring constant $K_{sp}$ of the magnetic spring.

<Variation 1>

Figure 16:
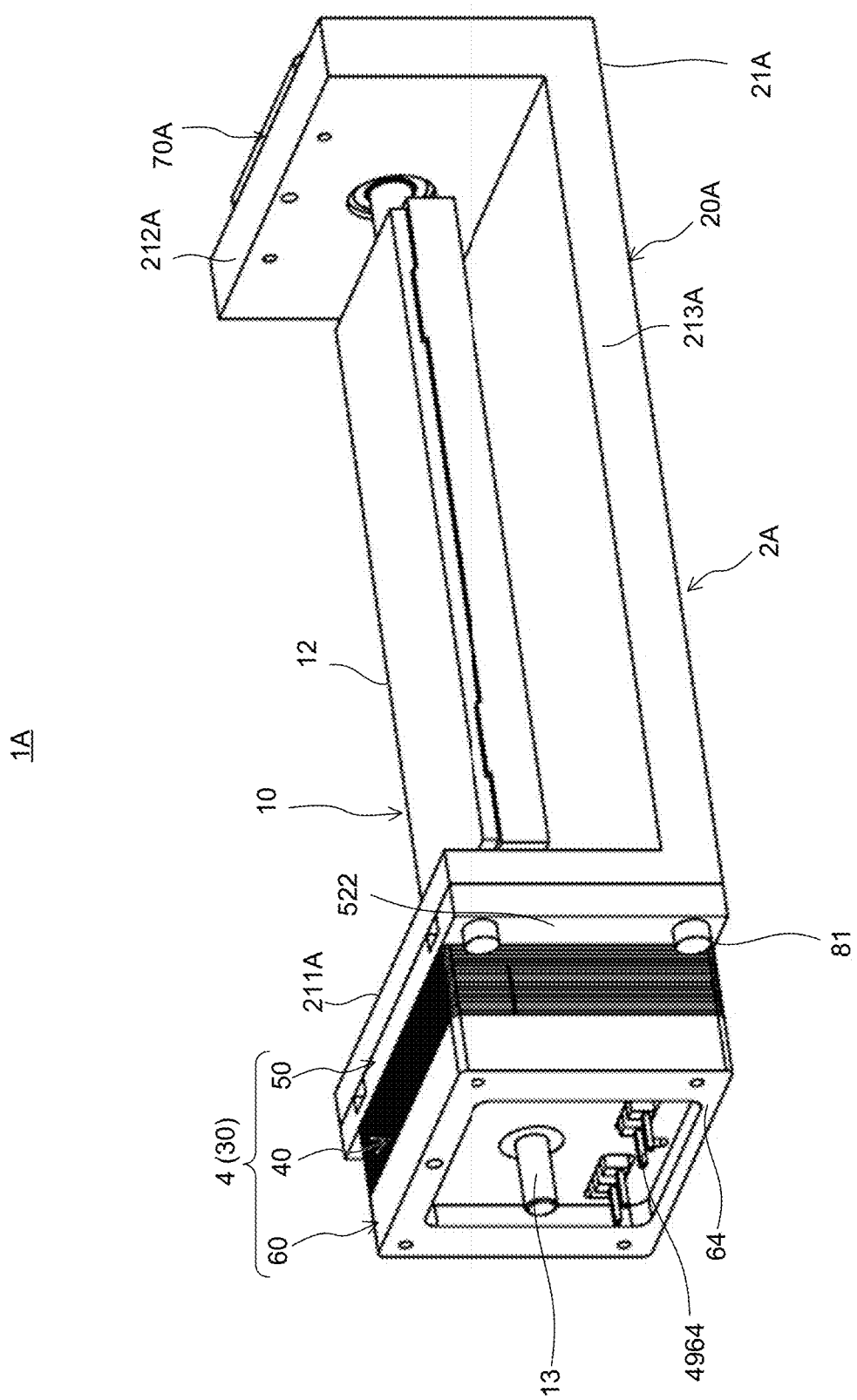
FIG. 16 is an external perspective view of Variation 1 of the rotary reciprocating drive actuator.
Figure 17:
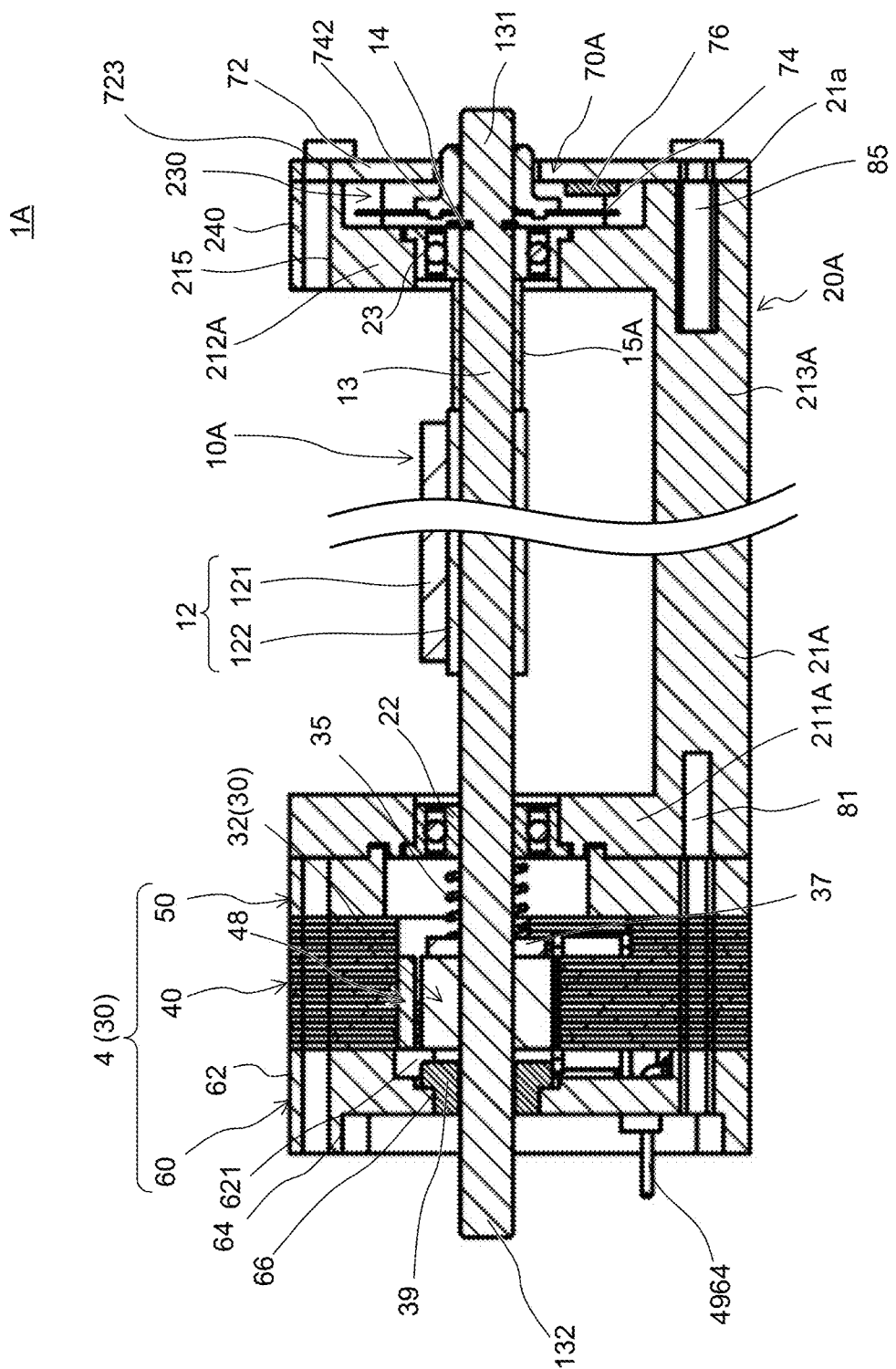
FIG. 17 is a longitudinal sectional view illustrating Variation 1 of the rotary reciprocating drive actuator.
Figure 18:
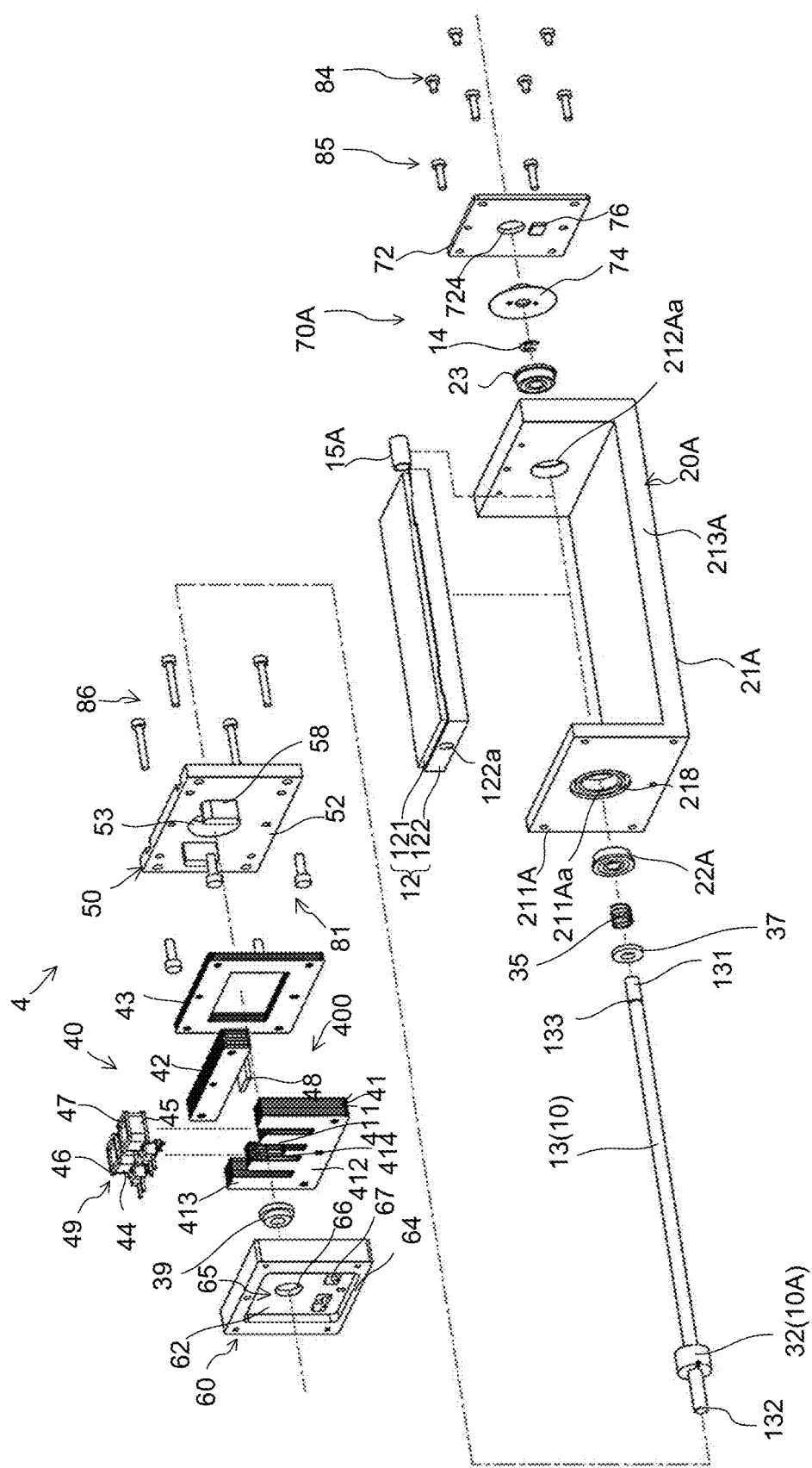
FIG. 18 is an exploded perspective view of Variation 1 of the rotary reciprocating drive actuator.
Figure 19:
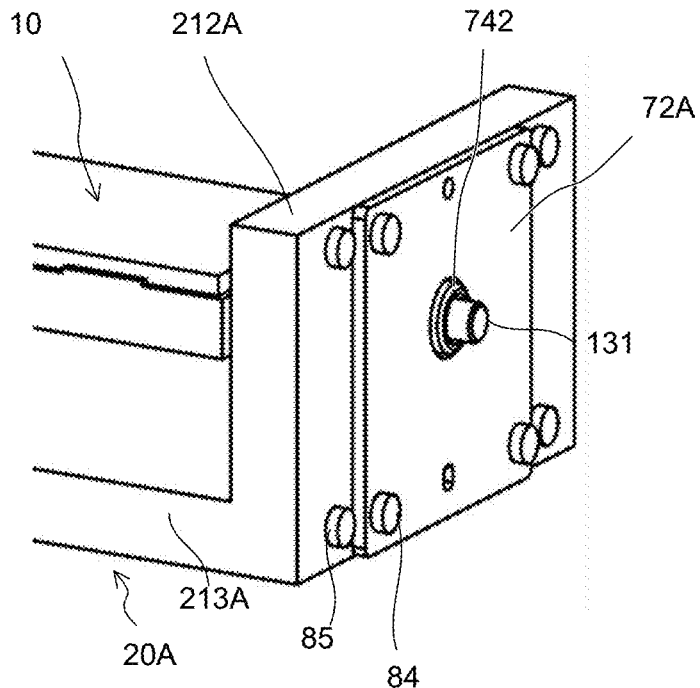
FIG. 19 is a perspective view of a wall portion on a front surface side of Variation 1 of the rotary reciprocating drive actuator.

FIG. 16 is an external perspective view of Variation 1 of the rotary reciprocating drive actuator, and FIG. 17 is a longitudinal sectional view of Variation 1 of the rotary reciprocating drive actuator as seen in a section taken along the axial center. FIG. 18 is an exploded perspective view of Variation 1 of the rotary reciprocating drive actuator, and FIG. 19 is a perspective view of the wall portion on one end portion side in Variation 1 of the rotary reciprocating drive actuator. FIG. 20 is a front-side exploded perspective view of the sensor part disposed on the wall portion on the one end portion side.

Rotary reciprocating drive actuator 1A of Variation 1 differs from rotary reciprocating drive actuator 1 with substantially the same configuration only in a configuration in which the board holding portion at angle sensor part 70A attached to the wall portion 212A side at the one end portion side of base portion 21A is disposed on wall portion 212A, and the other configurations are the same. Therefore, the same names having the same functions are denoted by the same reference numerals, and description thereof will be omitted, and only differences will be described.

In rotary reciprocating drive actuator 1A illustrated in FIGS. 16 to 20, main body unit 2A is configured by attaching movable body 10A to base portion 21A. Main body unit 2A is configured by attaching movable body 10 to base portion 21A. In addition, base portion 21A and driving unit 4 constitute fixing body 20A that supports movable body 10 such that the reciprocating rotation of movable body 10 is capable of being driven. Rotary reciprocating drive actuator 1A includes angle sensor part 70A on wall portion 212A that is the other end portion of main body unit 2A, and includes driving unit 4 on wall portion 211A that is disposed on one end portion side of main body unit 2A. Angle sensor part 70A includes encoder disk 74, optical sensor 76, and sensor board 72.

Unlike rotary reciprocating drive actuator 1, rotary reciprocating drive actuator 1A does not include a board holding portion, and wall portion 212A is integrally provided with the functions of the board holding portion. Wall portion 212A and wall portion 211A are vertically erected respectively from the opposite end portions of flat plate-shaped bottom portion 213A configured similarly to bottom portion 213, and face each other while spaced apart from each other. Recessed sensor placement portion 230 that opens toward other end portion 131 is formed in wall portion 212A of base portion 21A.

Specifically, wall portion 212A on the other end portion side of base portion 21A configured similarly to base portion 21 includes frame-shaped circumferential wall portion 240 having the same functions as board holding portion 73. Recessed sensor placement portion 230 is formed in outer surface 21a of wall portion 212A at a central portion surrounded by frame-shaped circumferential wall portion 240. One end portion 131 of rotation shaft 13 inserted through wall portion 212A protrudes from sensor placement portion 230.

In sensor placement portion 230, as in the embodiment, encoder disk 74 is fixed to rotation shaft 13 in the inside via attachment shaft part 742. In addition, sensor board 72 is attached to wall portion 212A so that optical sensor 76 mounted on sensor board 72 faces encoder disk 74 within sensor placement portion 230.

Sensor board 72 is attached to outer surface 21a of wall portion 212A by fastening members 84 via fastening holes 723 and 215 so as to cover sensor placement portion 230. According to the configuration of rotary reciprocating drive actuator 1A, the same advantages as the embodiment are achieved, and it is not required to use a separate member as the board holding portion. Therefore, it is possible to shorten the manufacturing time by reducing the number of components. When sensor board 72 is attached to wall portion 212A, sensor board 72 can be positioned to wall portion 212A at a suitable position around rotation shaft 13 by positioning holes 205 and 725 and position adjustment holes 207 and 727 formed in wall portion 212 and sensor board 72.

<Scanner System 100>

FIG. 21 is a block diagram illustrating a configuration of a principal part of scanner system 100 using rotary reciprocating drive actuator 1.

Scanner system 100 includes one of rotary reciprocating drive actuators 1 and 1A, and includes laser beam emitting part 101, laser control part 102, drive signal supply part 103, and position control signal calculation part 104 in addition to rotary reciprocating drive actuators 1 and 1A.

Laser beam emitting part 101 includes, for example, a Laser Diode (LD) serving as a light source, and a lens system for focusing the laser beam output by the light source. Laser control part 102 controls laser beam emitting part 101. A laser beam emitted by laser beam emitting part 101 is incident on mirror 121 of rotary reciprocating drive actuator 1.

With reference to an angular position of rotation shaft 13 (mirror 121) obtained by angle sensor part 70 and a target angle position, position control signal calculation part 104 generates and outputs a drive signal for controlling rotation shaft 13 (mirror 121) such that the mirror comes to the target angle position. For example, position control signal calculation part 104 generates a position control signal based on the obtained angular position of rotation shaft 13 (mirror 121) and a signal indicating the target angle position as converted using a saw waveform data or the like stored in a waveform memory (not illustrated). Position control signal calculation part 104 outputs the generated position control signal to drive signal supply part 103.

Based on the position control signal, drive signal supply part 103 supplies, to coils 44 and 45 of rotary reciprocating drive actuator 1, a drive signal such that the angular position of rotation shaft 13 (mirror 121) comes to the desired angular position. Thus, scanner system 100 can emit scanning light from rotary reciprocating drive actuator 1 to a predetermined scanning region.

<Summary>

As described above, rotary reciprocating drive actuator 1 according to the present embodiment includes movable body 10 including rotation shaft (shaft part) 13 to which the mirror part (movable object) is connected, and magnet 32 fixed to rotation shaft 13. Magnet 32 is a ring-type magnet in which S pole 32a and N pole 32b are alternately disposed on the outer circumferential surface in the circumferential direction. In addition, rotary reciprocating drive actuator 1 includes fixing body 20 including core assembly 40.

Rotation shaft 13 is rotatably supported by a pair of wall portions 211 and 212 of base portion 21. Core assembly 40 is attached to one wall portion 211 of the pair of wall portions 211 and 212, and angle sensor part 70 for detecting the rotational angle of rotation shaft 13 is disposed on other wall portion 212 of the pair of wall portions 211 and 212. Sensor (optical sensor) 76 is mounted in angle sensor part 70, and sensor board 72 is attached to other wall portion 212 from one end portion 131 side in a state where the sensor faces the other wall portion side.

As is understood, since the angle sensor components (encoder disk and the like) are disposed in the vicinity of bearing 23 at a position spaced apart from core assembly 40, there is no concern about the influence of electromagnetic noise and heat generation from the core assembly and mechanical influence during driving, and angle detection can be suitably performed without the influence of the shake of rotation shaft 13. Therefore, it is possible to accurately detect the rotation of the shaft connected to a movable object, and thus to drive the movable object more suitably at a high amplitude.

Sensor board 72 covers a detection part (encoder disk) of the sensor components from the outside of sensor placement portion 701 or 230. Thus, contamination into sensor placement portion 701 or 230 can be prevented by sensor board 72. As is understood, it is possible to prevent foreign matter from entering into sensor placement portion 701 or 230 and to drive the movable object suitably by performing accurate rotational angle detection.

Further, angle sensor part 70 is configured by disposing encoder disk 74 as a detection target portion on one end portion 131 of rotation shaft 13, and disposing optical sensor 76 mounted on sensor board 76 to face encoder disk 74 in the axial direction of rotation shaft 13. With this configuration, it is possible to achieve a layout allowing a minimized size of the configuration in which angle sensor part 70 is disposed, so as to achieve miniaturization of rotary reciprocating drive actuator 1 itself and to stably hold optical sensor 76.

Further, when angle sensor part 70 is maintained, the sensor components which are expensive components can be exposed to the outside at the time of malfunction only by removal of fastening members 84. It is thus possible to easily perform collection or replacement.

In addition, when the sensor part is an optical sensor, interference of light with sensor placement portion (which may also be an accommodation portion for accommodating a sensor) 701 or 230 can be prevented without using a separate light shielding member.

When driving unit 4 is fixed to main body unit 2 with reference to rotation shaft 13, it is desirable to fix the driving unit at a position where the dimensions can be defined from the reference. In addition, when the rotary reciprocating drive actuator is fixed to the housing of a product in a state where the shaft is erected vertically, assembly of the rotary reciprocating drive actuator and attachment of the rotary reciprocating drive actuator to the housing can be performed by positioning and fixation thereof in a direction parallel to the shaft. It is thus possible to perform highly accurate positioning and fixation with less frequent superimposed dimensioning than in the case of assembly in a direction different from the axial direction.

Further, a gap (clearance) narrower than an air gap between magnet 32 and core assembly 40 may be provided between bushing 39 and the outer circumference of rotation shaft 13. In this case, sliding between bushing 39 and rotation shaft 13 is eliminated, and impact resistance can be secured. Further, when bushing 39 and rotation shaft 13 are configured to slide, it is possible to reliably receive an impact, to prevent the impact on the sensor part, to damp unnecessary vibration of the movable body, and to reduce noise.

The movable object is mirror part 12 (particularly, mirror 121) that reflects scanning light. Thus, rotary reciprocating drive actuator 1 can be used for use in a scanner that performs optical scanning.

Further, in ring-shaped magnet 32 of rotary reciprocating drive actuators 1 and 1A of the present embodiment, magnetic pole switching portions 32c and 32d are formed as a U-shaped groove formed in one end face 322 as illustrated in FIGS. 22A and 22B, but do not need to be formed as a U-shaped groove. The magnetic pole switching portions may be configured in any form as long as the magnetic pole switching portions indicate a position in magnet 32 at which the magnetic poles are switched. Variations of magnet 32 will be described with reference to FIGS. 22A, 22B, 23A, 23B, 24A, 24B, 25A, 25B, and 26.

Figure 26:
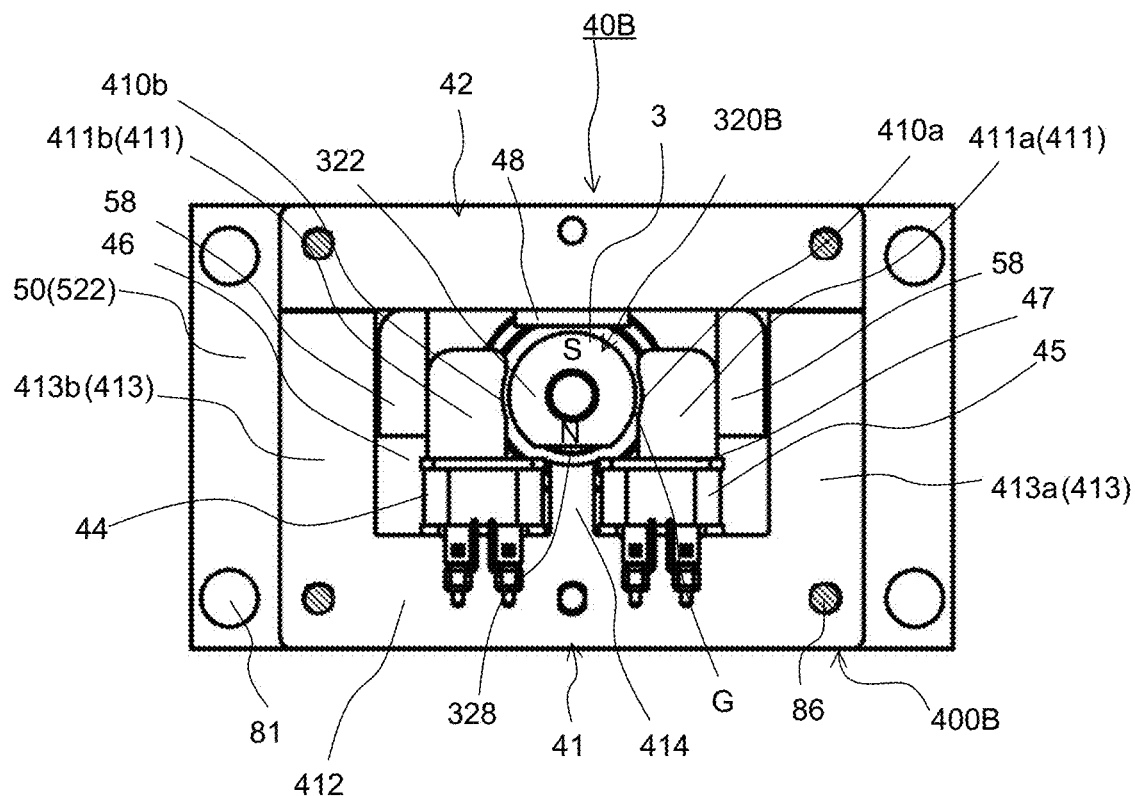
FIG. 26 illustrates a core assembly of the rotary reciprocating drive actuator having Variation 4 of the magnet.

FIGS. 22A, 22B, 23A, 23B, 24A, 24B, 25A, 25B, and 26 illustrate Variations 1 to 4 of the magnet of rotary reciprocating drive actuators 1 and 1A. FIGS. 23A, 23B, 24A, 24B, and 25B illustrate front side views and right side views of the magnet as the variations, and FIG. 26 is a view illustrating the core assembly of the rotary reciprocating drive actuator having Variation 4, and corresponds to an end view of a part of the rotary reciprocating drive actuator having magnet 32 at line A-A in FIG. 2.

Magnets 320, 320A, and 320B illustrated in FIGS. 23A, 23B, 24A, 24B, 25A, and are ring-shaped, and each of the magnets includes opening portion 321 through which rotation shaft 13 is inserted.

Magnet 320 illustrated in FIGS. 23A and 23B integrally includes protruding magnetic pole switching portions 32e and 32f on a diametrical portion of one end face 322. Magnetic pole switching portions 32*e* and 32*f* are protruding bodies (projections) formed on end face 322 on the same straight line, with opening portion 321 being sandwiched between magnetic pole switching portions 32*e* and 32*f*, and the end faces thereof may be rounded or may be flat end faces.

Magnetic pole switching portions 32*e* and 32*f* make it possible to determine switching positions of the magnetic poles in magnet 320 based on the shape of magnet 320.

Further, unlike magnet 320, magnet 320A illustrated in FIGS. 24A and 24B includes magnetic pole switching portions 32*g* and 32*h* having a V-shaped cross section instead of a U-shaped cross section in end face 322 of the ring-shaped main body.

Magnetic pole switching portions 32*g* and 32*h* make it possible to determine switching positions of the magnetic poles in magnet 320A based on the shape of magnet 320A.

Here, regarding the assembling accuracy of assembling magnets 32, 320, and 320A in the magnetic pole direction, well-balanced arrangement in accordance with an angular reference of mirror part 12 which is a movable object and an angular reference of angle sensor 70 is desirable. When a deviation occurs in each of the angular references, there is a problem that a change in characteristics occurs depending on a rotational angle of rotation shaft 13, which causes a performance variation.

Contrariwise, in magnets 32, 320, and 320A in the present embodiment, magnetic pole switching portions 32*c* to 32*h* are formed in a U-shape, a protruding shape, a V-shape, and the like, and magnets 32, 320, and 320A have shapes that protrude or are recessed in the magnetization direction.

Therefore, by using a positioning jig having a pin corresponding to the U-shape, the protruding shape, the V-shape, or the like, it is possible to attach other components or the like or to assemble the rotary reciprocating drive actuator with reference to magnetic pole switching portions 32*c*, 32*d*, 32*e*, 32*f*, 32*g*, and 32*h*.

That is, the positional relation between the components fixed to rotation shaft 13 can be adjusted with reference to the recessed portions or the protruding portions (magnetic pole switching portions 32*c*, 32*d*, 32*e*, 32*f*, 32*g*, 32*h*) at the time of assembly or maintenance of rotary reciprocating drive actuator 1. The angle reference of mirror part 12, the angle reference of angle sensor part 70, and the references of the magnetic poles of magnet 32 can be easily aligned, and highly accurate assembly can be easily realized in rotary reciprocating drive actuator 1.

Further, in magnet 32, when the protrusions or recesses are configured to be formed in the magnetization direction, an influence on magnetic poles 410*a* and 410*b* and rotational angle position holding portion (magnetic spring) 48 facing the outer circumferential surface is small, an influence on the torque is small, and further, variation in the property of the magnetic attraction force of rotational angle position holding portion 48 is prevented.

For example, magnet 320B illustrated in FIGS. 25A and 25B has flat surface 328 obtained by cutting out a part of outer circumferential surface 326. Flat surface 328 is disposed as a part of the outer circumferential surface of one of the different magnetic poles of magnet 320B.

When core assembly 40B having magnet 320B is placed in rotary reciprocating drive actuator 1, the placement is such that magnetic pole 32*b* opposed to magnetic pole 32*a* facing rotational angle position holding portion 48 illustrated in FIG. 26 has flat surface 328. Flat surface 328 faces a curved surface of complementary pole portion 414. Specifically, when magnet 320B is at a reference position, flat surface 328 is disposed such that the lengthwise center of the flat surface in the circumferential direction (horizontal direction) and the center of complementary pole portion 414 in the circumferential direction (horizontal direction) are located on a line passing through the center of opening portion 321 (or of rotation shaft 13, 13A) and being perpendicular to flat surface 328.

In magnet 320B, for example, when flat surface 328 is disposed to face the rotational angle position holding portion 48 side or the core (magnetic poles 410*a* and 410*b*) side, the flow of the magnetic flux generated is unbalanced since the flat surface is only one flat part of magnet 320B. Accordingly, the magnetic circuit properties may be affected, and/or the performance may be deteriorated.

In contrast, in the present embodiment, flat surface 328 of magnet 320B is disposed on the side opposite to rotational angle position holding portion 48, with rotation shaft 13 being interposed therebetween, when the magnet is in the non-energized state, for example, when the magnet is at the reference position. As a result, flat surface 328 can generate a magnetic attraction force between itself and complementary pole portion 414 while avoiding an influence on rotational angle position holding portion 48, that is, avoiding an imbalance in torque generation. It is also possible to assemble other components or the like or to assemble the rotary reciprocating drive actuator using flat surface 328 with reference to the magnet 320B.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

For example, the embodiment has been described in connection with the case where the movable object is mirror part 12, but the movable object is not limited to this. The movable object may be, for example, an imaging device such as a camera.

For example, while the embodiment has been described in connection with the case of resonantly driving rotary reciprocating drive actuator 1, the present invention is also applicable to the case of non-resonant driving.

The configuration of driving unit 4 is not limited to that described in the embodiment. For example, the core only needs to include the magnetic pole portions which are magnetically excited by energization of the coils to generate polarities, and only needs to be such that when the rotation shaft is attached to the fixing body, the magnetic pole portions and the outer circumferential surface of the magnet face each other via an air gap. Further, the coil only needs to be configured to generate a magnetic flux suitably from one of the magnetic pole portions of the core toward the other during energization.

Further, although rotational angle position holding portion 48 disposed in fixing body is attached to second core 42, the present invention is not limited thereto, and rotational angle position holding portion 48 may also be disposed on another component of fixing body 20. Further, for example, rotational angle position holding portion 48 may be disposed to protrude from the front surface of cover main body 52 or the rear surface of top cover main body 62 so as to be disposed at the same position as the position of rotational angle position holding portion 48 attached to second core 42. In these cases, rotational angle position holding portion 48 may be accommodated in driving unit 4.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

INDUSTRIAL APPLICABILITY

The present invention is suitable for use, for example, in a LiDAR apparatus, a scanner system, and the like.

REFERENCE SIGNS LIST 1, 1A Rotary reciprocating drive actuator
2 Main body unit
4 Driving Unit
10A Movable body
12 Mirror part
13 Rotation shaft (shaft part)
14 Retaining portion
15A Stopper portion
20 Fixing body
21, 21A Base portion
21a Outer surface
22, 23 Bearing
30 Driving part
32, 320, 320A, 320B Magnet
32a, 32b, 410a, 410b Magnetic pole
32c, 32d, 32e, 32f, 32g, 32h Magnetic pole switching portion
35 Preload spring
37 Annular receiving portion
39 Bushing
40 Core Assembly
41 First core
42 Second core
43 Third core
44, 45 Coil
46, 47 Bobbin
48 Rotational angle position holding portion
49 Coil body
50 Bottom cover
52 Cover main body
53, 321, 732 Opening portion
54, 55, 66 Through-hole
56, 205, 705, 725 Positioning hole
57, 207, 707, 727 Position adjustment hole
58 Positioning projection
60 Top cover
62 Top cover main body
64 Circumferential wall portion
67 Bobbin engaging hole
70A Angle sensor part
72 Sensor board
73 Board holding portion
74 Encoder disk (detection target portion)
76 Optical sensor
81, 84, 85, 86 Fastening member
100 Laser system
101 Laser beam emitting part
102 Laser control part
103 Drive signal supply part
104 Position control signal calculation part
121 Mirror
122 Mirror holder
122a, 211a, 212a Insertion hole
131 One end portion
132 Other end portion
133 Fitting groove
203, 215, 402, 702, 703, 723 Fastening hole
211, 211A Wall portion (one wall portion)
212, 212A Wall portion (other wall portion)
211a, 211Aa, 212a Insertion hole
213, 213A Bottom portion
218 Recessed portion
222, 232 Bearing main body
224, 234 Flange
230, 701 Sensor placement portion
322 End face
326 Outer circumferential surface
328 Flat surface
400 Core Body
411, 411a, 411b Rod-shaped portion
412 Connecting side portion
413, 413a, 413b Lateral side portion
414 Complementary pole portion
492 Bobbin portion
494 Terminal support portion
496 Terminal
522 Attachment portion
541 Spot-facing portion
621 Depressed portion
742 Attachment shaft part
4964 Other side portion
4962 One side portion

The invention claimed is:
1. A rotary reciprocating drive actuator, comprising:
a movable body including:
  a shaft part to which a movable object is connected at one end portion side of the shaft part, and
  a magnet fixed at an other end portion side of the shaft part, the movable body being configured to perform a reciprocating rotation about an axis;
a base portion including a pair of wall portions that are disposed to sandwich the movable object and support the shaft part via a bearing at the one end portion side such that the shaft part is rotatable;
a core assembly including:
  a core body including a plurality of magnetic poles facing an outer circumference of the magnet to sandwich the magnet,
  a coil body that is wound around the core body and that is energized to generate a magnetic flux interacting with the magnet to cause a reciprocating rotation of the movable body, and
  a magnet position holding portion that generates a magnetic attraction force between the magnet position holding portion and the magnet to define a reference position of the reciprocating rotation, the core assembly being attached to a first wall portion of the pair of wall portions; and
a sensor board that is attached to a second wall portion of the pair of wall portions and on which a sensor configured to detect a rotational angle of the shaft part is mounted, wherein;
the outer surface of the second wall portion is provided with a concave sensor placement portion through which the one end portion of the shaft part is inserted and which opens to the outside, and
the sensor board is positioned within the sensor placement portion so as to face the sensor toward the second wall portion and to close the sensor placement portion.
2. The rotary reciprocating drive actuator according to claim 1, wherein a number of poles of the plurality of magnetic poles is two.

3. The rotary reciprocating drive actuator according to claim 1, wherein
the sensor is an optical sensor.

4. The rotary reciprocating drive actuator according to claim 1, further comprising:
a board holding portion on the axially outer surface side of the second wall portion, the board holding portion surrounding the sensor and being configured to hold the sensor board attached to the board holding portion.

5. The rotary reciprocating drive actuator according to claim 1, wherein
the movable object is a mirror for reflecting scanning light.

* * * * *